United States Patent
Yamada et al.

(10) Patent No.: US 8,233,677 B2
(45) Date of Patent: Jul. 31, 2012

(54) IMAGE SENSING APPARATUS AND IMAGE FILE DATA STRUCTURE

(75) Inventors: Akihiko Yamada, Daito (JP); Kazuhiro Kojima, Daito (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 1025 days.

(21) Appl. No.: 12/167,646

(22) Filed: Jul. 3, 2008

(65) Prior Publication Data

US 2009/0010570 A1 Jan. 8, 2009

(30) Foreign Application Priority Data

Jul. 4, 2007 (JP) ................................. 2007-175949
Jun. 26, 2008 (JP) ................................. 2008-167153

(51) Int. Cl.
*G06K 9/00* (2006.01)

(52) U.S. Cl. ......................................................... 382/118

(58) Field of Classification Search .................. 382/100, 382/118, 215, 275, 282
See application file for complete search history.

(56) References Cited

U.S. PATENT DOCUMENTS

| | | | | |
|---|---|---|---|---|
| 5,862,218 | A * | 1/1999 | Steinberg | 713/176 |
| 7,653,259 | B2 * | 1/2010 | Pilu | 382/276 |
| 2002/0093567 | A1 * | 7/2002 | Cromer et al. | 348/207 |
| 2004/0081338 | A1 | 4/2004 | Takenaka | |
| 2008/0205796 | A1 * | 8/2008 | Jonsson | 382/311 |

FOREIGN PATENT DOCUMENTS

| | | |
|---|---|---|
| JP | 11-252504 A | 9/1999 |
| JP | 2002-010063 | 1/2002 |
| JP | 2004-62560 A | 2/2004 |
| JP | 2005-49939 A | 2/2005 |
| JP | 2007-164275 A | 6/2007 |

OTHER PUBLICATIONS

English Translation of Notification of Reasons for Refusal issued by the Japanese Patent Office for Japanese Application No. 2008-167153, mailed Apr. 24, 2012, 4 pages.
Japanese version of Japanese Office Action for Japanese Application No. 2008-167153, mailed on Apr. 24, 2012, 3 pages.
English Abstract for Japanese Publication No. 2007-164275, dated Jun. 28, 2007, downloaded on Apr. 24, 2012, 1 page.
English Abstract for Japanese Publication No. 2005-049939, dated Feb. 24, 2005, downloaded on Apr. 24, 2012, 1 page.
English Abstract for Japanese Publication No. 11-252504, dated Sep. 17, 1999, downloaded on Apr. 24, 2012, 1 page.

* cited by examiner

*Primary Examiner* — Daniel Mariam
(74) *Attorney, Agent, or Firm* — NDQ&M Watchstone LLP

(57) ABSTRACT

An image-sensing apparatus has: an image-sensing portion that acquires an original image by shooting a subject; an alteration processor that applies reversible alteration to an image inside a specific region in the original image to produce from the original image an altered image; and a recording controller that records in a recording portion an image file in which the altered image is stored in association with restoration-oriented information that identifies the contents of the restoration that needs to be performed to restore the original image from the altered image.

25 Claims, 25 Drawing Sheets

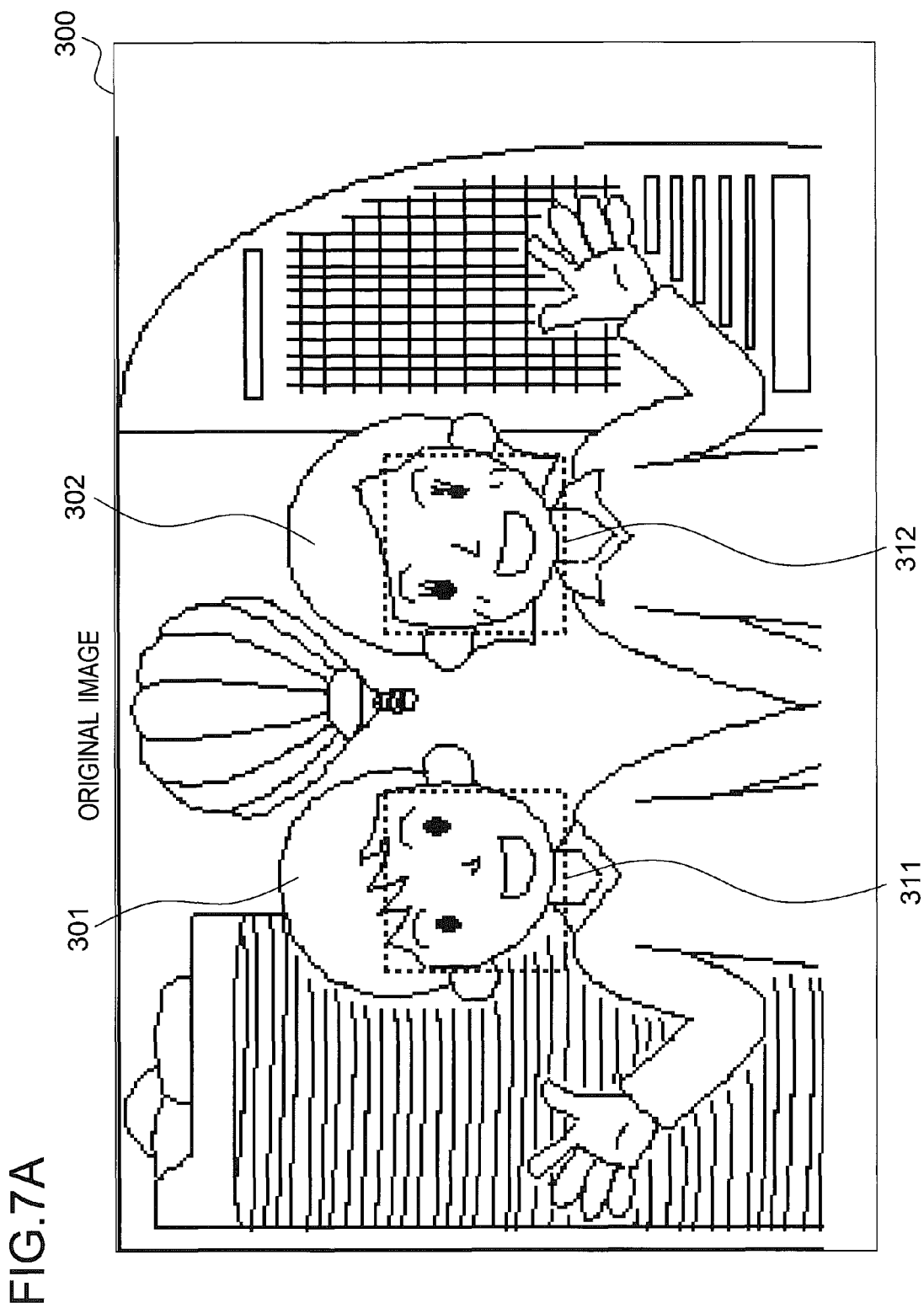

FIG.10

PUBLICATION MANAGEMENT RELATIONSHIP INFORMATION

| USER PC:VIEWING PC 101 | 1ST PUBLICATION RELATIONSHIP (FRIEND) |
|---|---|
| USER PC:VIEWING PC 102 | 2ND PUBLICATION RELATIONSHIP (FRIEND'S FRIEND) |
| USER PC:VIEWING PC 103 | 3RD PUBLICATION RELATIONSHIP (GENERAL PUBLIC) |

FIG.11

PUBLICATION LEVEL INFORMATION

| 1ST PUBLICATION RELATIONSHIP | 1ST AUTHORIZATION (RESTORATION PERMITTED) |
|---|---|
| 2ND PUBLICATION RELATIONSHIP | 2ND AUTHORIZATION |
| 3RD PUBLICATION RELATIONSHIP | 3RD AUTHORIZATION (RESTORATION PROHIBITED) |

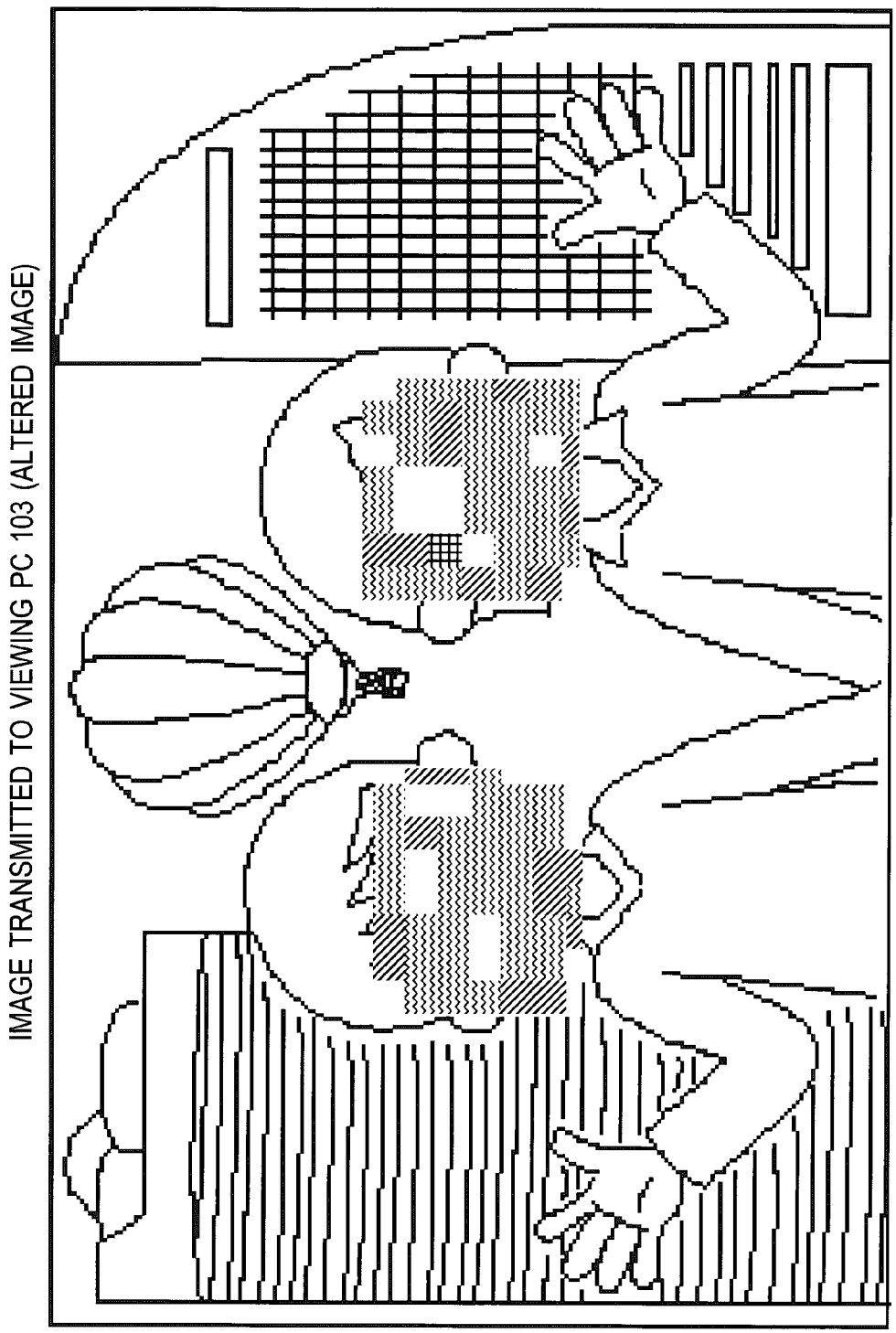

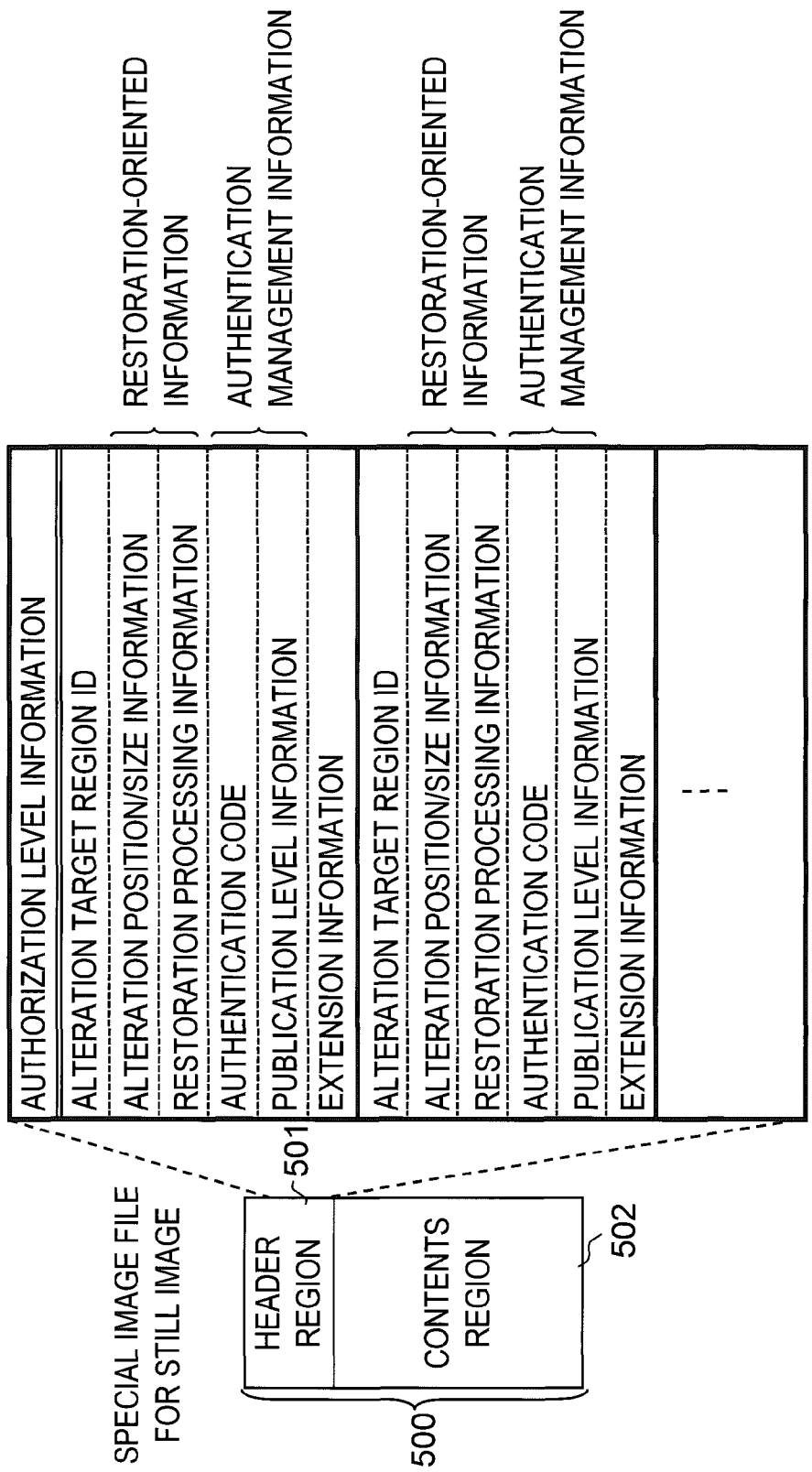

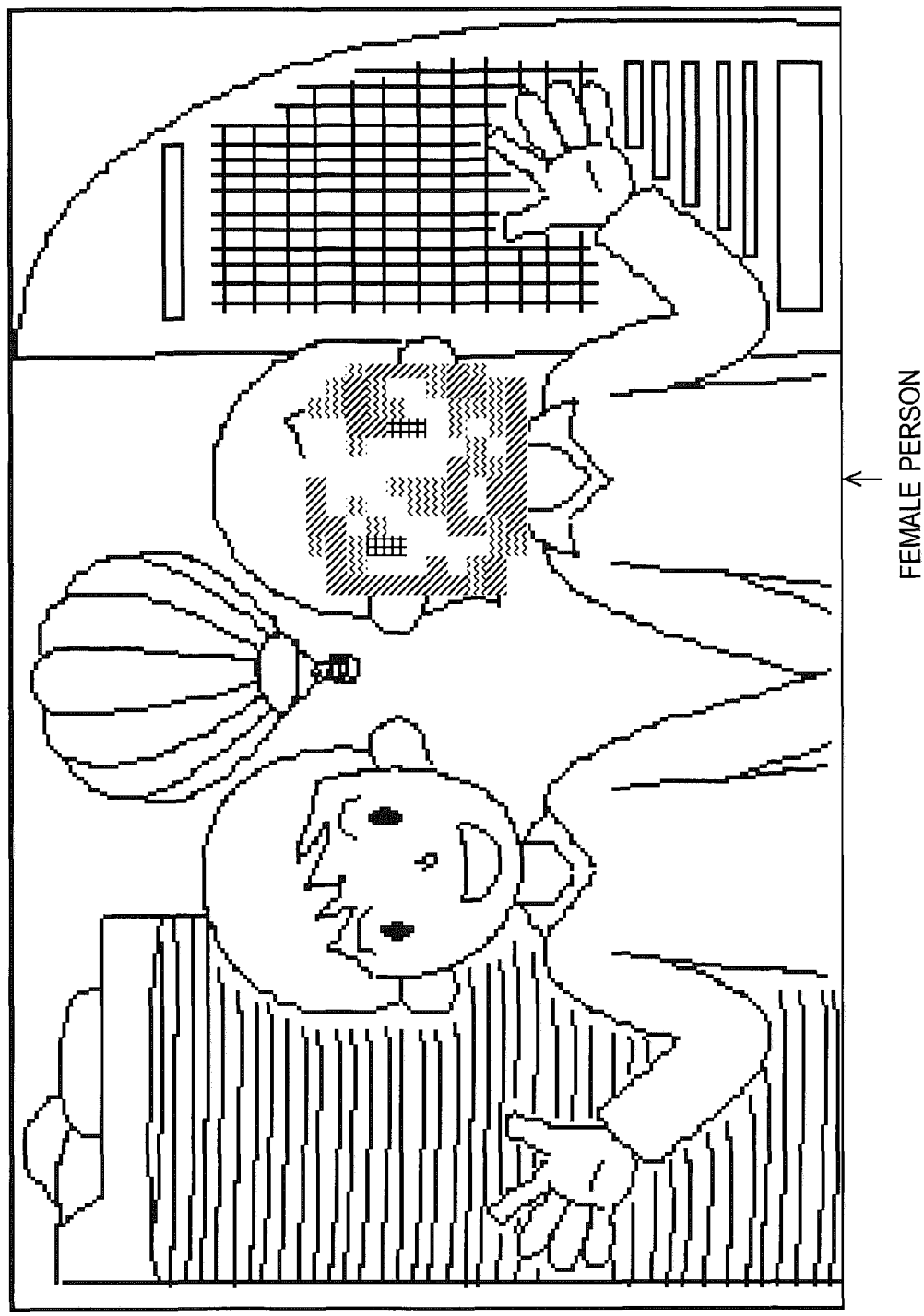

IMAGE SENSING APPARATUS AND IMAGE FILE DATA STRUCTURE

This nonprofessional application claims priority under 35 U.S.C. §119(a) on Pat. application Ser. No. 2007-175949 filed in Japan on Jul. 4, 2007 and Pat. application Ser. No. 2008-167153 filed in Japan on Jun. 26, 2008, the entire contents of both of which are hereby incorporated by reference.

BACKGROUND OF THE INVENTION

1. Field of the Invention

The present invention relates to an image-sensing apparatus such as digital still cameras and digital video cameras. The present invention also relates to a data structure of an image file in which image data is stored. The present invention further relates to, in connection with such an image-sensing apparatus and an image file as just mentioned, an information providing apparatus, a terminal apparatus, an image display apparatus, and an image file recording method.

2. Description of Related Art

In the past, personally shot still and moving images were usually viewed by limited people—the photographer/shooter himself, his family, his friends, etc. However, with the recent spread of digital cameras and of information sharing services such as social network services (hereinafter abbreviated to "SNSs") and so-called blogs, there have been an increasing number of occasions on which personally shot still and moving images are put open (published) to the general public. On the other hand, there has been increasing awareness of protection of right-of-portrait, copyright, privacy, etc.

Privacy etc. may be protected by use of restricted publication (restricted viewing) adopted in SNSs and the like, but this completely prevents unauthorized users (recipients of images) from getting to know the contents of restriction-target images. Since protection of privacy etc. is achieved by restricting publication of only such details as do need protection, it does not always fit the intention of a provider of an image to restrict the publication of the entire image.

By some conventional methods, out of the entire region of an original image, a face region or a text region is extracted, and this region is subjected to alteration, such as pixelization or blacking-out, so that the contents of the image in that region is unidentifiable. With these methods, however, once the alteration is applied, it is difficult to restore the original, unaltered image. This makes it impossible even for users authorized to view the original image to view its contents.

SUMMARY OF THE INVENTION

According to one aspect of the present invention, an image-sensing apparatus is provided with: an image-sensing portion that acquires an original image by shooting a subject; an alteration processor that applies reversible alteration to an image inside a specific region in the original image to produce from the original image an altered image; and a recording controller that records in a recording portion an image file in which the altered image is stored in association with restoration-oriented information that identifies the contents of the restoration that needs to be performed to restore the original image from the altered image.

For example, the recording controller may also store in the image file, in association with the altered image and the restoration-oriented information, authorization management information for switching between whether to permit or prohibit restoration, for bringing into a viewable state, of the original image from the altered image according to the restoration-oriented information.

Specifically, for example, the image-sensing apparatus may be further provided with: a specific region detector that detects from the original image a region having a specific image characteristic based on the image data of the original image, and the alteration processor may set the specific region based on the region detected by the specific region detector.

Specifically, for example, the image-sensing apparatus may be further provided with: a specific operation accepter that accepts an operation for specifying the specific region from outside, the alteration processor may set the specific region according to the operation.

For example, the region having the specific image characteristic detected by the specific region detector may be a face region including a person's face; the specific region detector may check whether or not a face region it has detected fulfills a specific condition, and the alteration processor may set the specific region based on a face region that has been judged to fulfill the specific condition.

For example, a face region may be judged to fulfill the specific condition if the face region is classified as one or more of a face region of a person previously registered on the image-sensing apparatus, a face region of a person of a specific sex, a face region of a person of a specific race, and a face region of a person of a specific age group.

For example, the image-sensing portion may acquire an original moving image composed of a chronological sequence of a plurality of original images; the image-sensing apparatus may be further provided with a tracking processor that tracks a specific subject within the original moving image based on the image data of the original moving image; the alteration processor may take one of the plurality of original images as a reference original image and set in the reference original image a specific region including the specific subject; the alteration processor may then, based on the result of the tracking by the tracking processor, set in the original images other than the reference original image specific regions respectively such that these specific regions in the original images other than the reference original image include the specific subject, and then apply the alteration to images inside the specific regions set in the original images respectively to generate from the original moving image an altered moving image composed of a chronological sequence of a plurality of altered images.

For example, the specific region in the reference original image may be set based on the image data of the reference original image or based on an operation from outside.

Specifically, for example, the restoration-oriented information may include information indicating the position and size of the specific region in the altered image.

Specifically, for example, the alteration may include pixelization or masking for altering the image inside the specific region.

For example, the authorization management information may include an authentication code, and the image-sensing apparatus and another image-sensing apparatus may be previously assigned different individual codes; the image-sensing apparatus may be provided with: a display portion; a restoration processor that restores the original image from the altered image based on the restoration-oriented information; a checker that checks the authentication code and the individual code assigned to the image-sensing apparatus against each other; and a determiner the determines based on the result of the checking by the checker whether or not to permit display of the original image restored by the restoration processor on the display portion; the restoration processor and the display portion may be controlled according to the result of the determination by the determiner.

According to another aspect of the present invention, an image file data structure is such that the data of an altered image obtained by applying reversible alteration to an image inside a specific region in an original image and the data of restoration-oriented information identifying the contents of the restoration that needs to be performed to restore the original image from the altered image are stored in association with each other.

For example, the data of authorization management information for switching between whether to permit or prohibit restoration, for bringing into a viewable state, of the original image from the altered image according to the restoration-oriented information may also be stored in association with the data of the altered image and the data of restoration-oriented information.

According to yet another aspect of the present invention, an information providing apparatus that receives the image file described above from a source apparatus and that transmits, in response to a transmission request from a terminal apparatus having a predetermined relationship with the source apparatus and having a display portion, information based on the image file to the terminal apparatus over a communications network is provided with: a restoration processor that restores an original image from an altered image in the image file based on restoration-oriented information in the image file. Here, in response to the transmission request, based on the authorization management information in the image file and based on the relationship, whether or not to permit transmission of the original image restored by the restoration processor to the terminal apparatus is determined and, according to the result of the determination, the contents transmitted to the terminal apparatus are controlled.

For example, the information providing apparatus may previously know the relationship; according to the authorization management information and the relationship, the terminal apparatus may be given one of a plurality of levels of authorization including a first and a second authorization; when the terminal apparatus is given the first authorization, in response to the transmission request, the original image restored by the restoration processor may be transmitted to the terminal apparatus, and, when the terminal apparatus is given the second authorization, in response to the transmission request, transmission of the original image restored by the restoration processor to the terminal apparatus may be prohibited.

According to yet another aspect of the present invention, a terminal apparatus is provided with a display portion; the terminal apparatus receives, from the information providing apparatus described above over a communications network, information based on the image file, and displays an image based on the received information on the display portion.

According to still another aspect of the present invention, an image display apparatus is provided with: a file input portion that receives the image file described above; and a display portion. Here, the authorization management information in the image file includes an authentication code, and the image display apparatus is further provided with: a restoration processor that restores the original image from the altered image in the image file based on the restoration-oriented information in the image file; a checker that checks the authentication code and a code registered in the image display apparatus against each other; and a determiner that determines based on the result of the checking by the checker whether or not to permit display of the original image restored by the restoration processor on the display portion. The restoration processor and the display portion are controlled according to the result of the determination by the determiner.

According to a further aspect of the present invention, an image file recording method is such that the data of an altered image obtained by applying reversible alteration to an image inside a specific region in an original image and the data of restoration-oriented information identifying the contents of the restoration that needs to be performed to restore the original image from the altered image are recorded in association with each other.

The significance and benefits of the invention will be clear from the following description of its embodiments. It should however be understood that these embodiments are merely examples of how the invention is implemented, and that the meanings of the terms used to describe the invention and its features are not limited to the specific ones in which they are used in the description of the embodiments.

BRIEF DESCRIPTION OF THE DRAWINGS

FIG. 7A is a diagram showing an example of an original image fed into the alteration processor in FIG. 6.

FIG. 10 is a diagram showing an example of the contents of publication management relationship information prescribing the relationships between the user PC and the individual viewing PCs in FIG. 3;

FIG. 11 is a diagram showing an example of the contents of the publication level information in a special image file saved in the server HDD in FIG. 5;

FIGS. 12A to 12C are diagrams respectively showing the three images that the server, on receiving a transmission request from the three viewing PCs shown in FIG. 3, transmits to them;

FIG. 17 is a diagram showing the data structure of a special image file for a still image in Example 7 of the invention;

FIGS. 18A to 18D are diagrams each showing an example of an altered image generated by the alteration processor in FIG. 6 in Example 8 of the invention;

DETAILED DESCRIPTION OF PREFERRED EMBODIMENTS

Hereinafter, embodiments of the present invention will be described specifically with reference to the accompanying drawings. Among different drawings referred to in the course of the description, the same parts are identified by common reference signs, and in principle no overlapping description of the same parts will be repeated. Before the presentation of Examples 1 to 9, first, those features which are common to, or referred to in the description of, different examples will be described.

Figure 1:
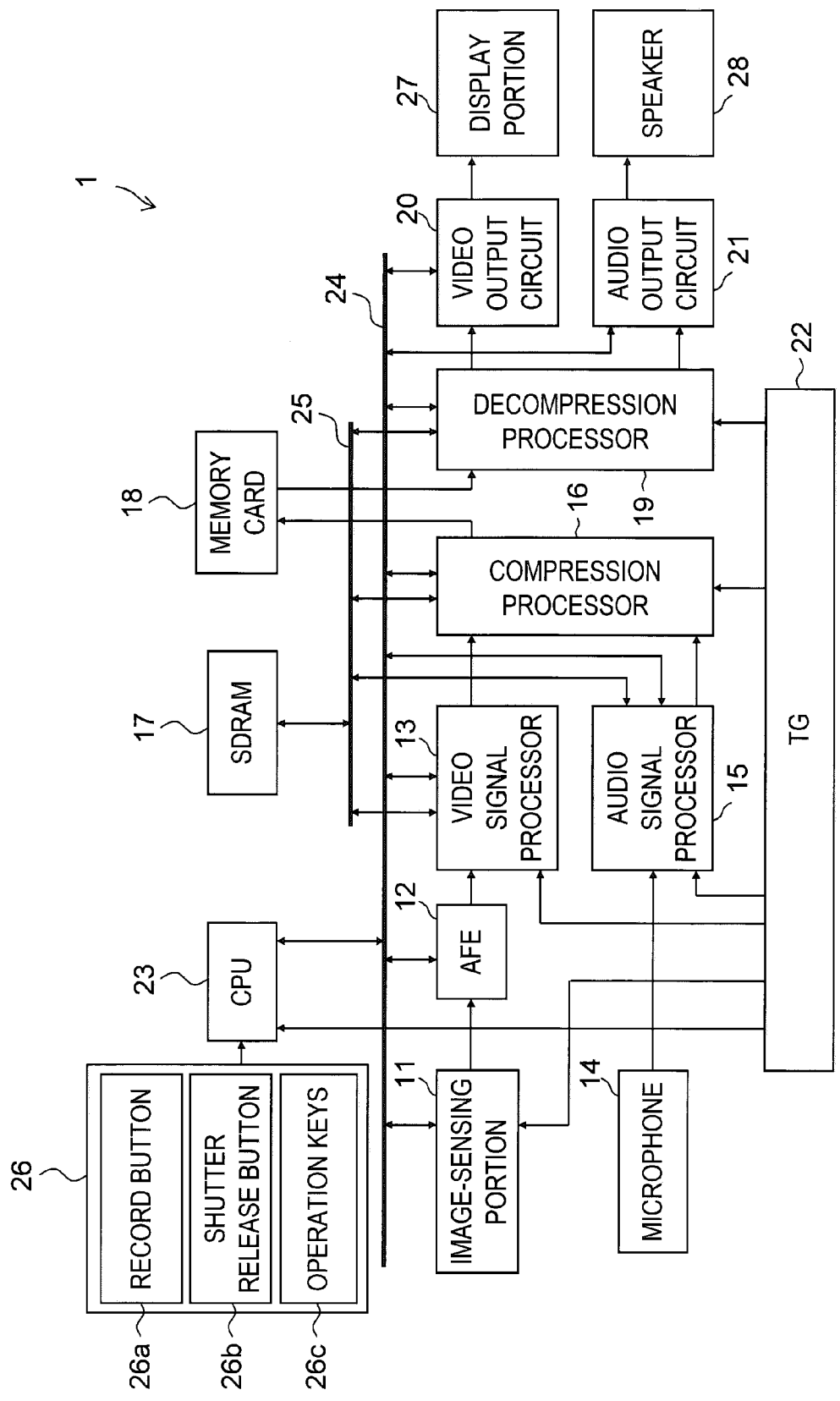
FIG. 1 is an overall block diagram of an image-sensing apparatus embodying the invention.

FIG. 1 is an overall block diagram of an image-sensing apparatus 1 embodying the invention. The image-sensing apparatus 1 is a digital video camera capable of shooting moving and still images. The image-sensing apparatus 1 may instead be a digital still camera capable of shooting still images alone. As shown in FIG. 1, the image-sensing apparatus 1 is provided with individual blocks referred to by the reference signs 11 to 28.

First, the basic operation of the individual blocks within the image-sensing apparatus 1 will be described. The individual blocks within the image-sensing apparatus 1 exchange signals (data) with one another via a bus 24 or 25. A TG 22 generates timing control signals for controlling the timing of different operations in the image-sensing apparatus 1 as a whole, and feeds the generated timing control signals to the individual blocks within the image-sensing apparatus 1. The timing control signals include a vertical synchronizing signal Vsync and a horizontal synchronizing signal Hsync.

A CPU 23 controls in a centralized fashion the operation of the individual blocks within the image-sensing apparatus 1. An operated portion 26 accepts operations made by a user. The operated portion 26 has a record button 26a, a shutter release button 26b, operation keys 26c, etc. Operations made on the operated portion 26 are transmitted to the CPU 23. Various settings on the image-sensing apparatus 1 are made mainly via the operation keys 26c. An SDRAM 17 functions as a frame memory. The individual blocks within the image-sensing apparatus 1, as necessity arises, temporarily record various kinds of data (digital signals) in the SDRAM 17. A memory card 18 is an external storage medium, and is, for example, an SD (Secure Digital) memory card. Although this embodiment takes up a memory card 18 as an example of an external storage medium, the external storage medium may include any one or more types of random-access storage medium (such as semiconductor memory, memory card, optical disc, magnetic disk, etc.).

Figure 2:
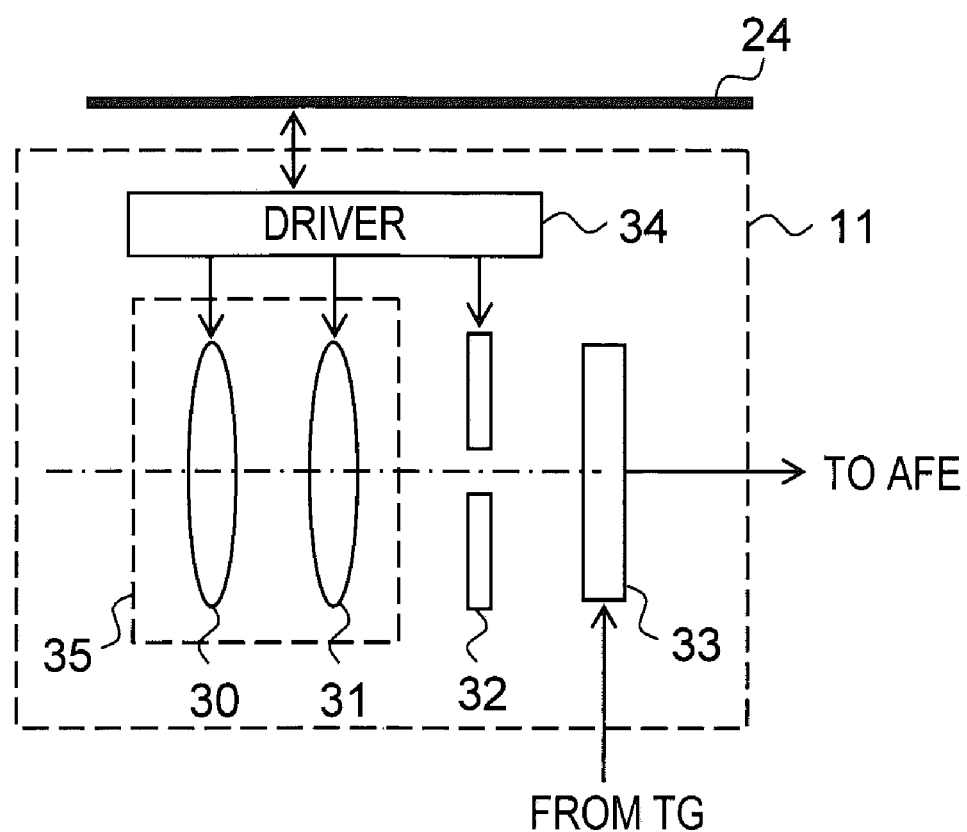
FIG. 2 is an internal configuration diagram of the image-sensing portion in FIG. 1.

FIG. 2 is an internal configuration diagram of an image-sensing portion 11 in FIG. 1. The image-sensing portion 11 incorporates color filters etc. so as to be capable of generating color images by shooting.

The image-sensing portion 11 has an optical system 35, an aperture stop 32, an image-sensing device 33, and a driver 34. The optical system 35 is composed of a plurality of lenses including a zoom lens 30 and a focus lens 31. The zoom lens 30 and the focus lens 31 are both movable along the optical axis. According to control signals from the CPU 23, the driver 34 controls the movement of the zoom lens 30 and the focus lens 31 thereby to control the zoom magnification and the focal length of the optical system 35. Also, according to control signals from the CPU 23, the driver 34 controls the degree of aperture (aperture value) of the aperture stop 32.

The light from a subject travels through the individual lenses composing the optical system 35 and through the aperture stop 32 to reach the image-sensing device 33. The individual lenses composing the optical system 35 focus an optical image of the subject on the image-sensing device 33. The TG 22 generates for driving the image-sensing device 33 drive pulses synchronous with the timing control signals mentioned above, and feeds those drive pulses to the image-sensing device 33.

The image-sensing device 33 is an image sensor or the like, and is, for example, a CCD (charge-coupled device) image sensor or CMOS (complementary metal oxide semiconductor) image sensor. The image-sensing device 33 photoelectrically converts the optical image it has received through the optical system 35 and the aperture stop 32, and feeds the resulting electrical signal to an AFE 12. More specifically, the image-sensing device 33 is provided with a plurality of pixels (light-receiving pixels, unillustrated) arrayed in a two-dimensional matrix; in each unit period of shooting, those pixels each store, as a signal charge, an amount of electric charge commensurate with the period of exposure. The electrical signals from the individual pixels, having levels proportional to the amounts of electric charge stored as signal charges there, are fed out sequentially in synchronism with the drive pulses from the TG 22 to the AFE 12 in the succeeding stage.

The AFE 12 amplifies the analog signals fed out from the image-sensing portion 11 (the image-sensing device 33), and converts the amplified analog signals into digital signals. The AFE 12 then feeds the digital signals sequentially out to a video signal processor 13.

According to the output signal of the AFE 12, the video signal processor 13 generates a video signal representing the image shot by the image-sensing portion 11 (hereinafter also referred to as "shot image" or "frame image"). The video signal is composed of a luminance signal Y representing the luminance of the shot image and color-difference signals U and V representing the color of the shot image. The video signal generated by the video signal processor 13 is fed to a compression processor 16 and to a video output circuit 20.

The video signal processor 13 also detects an AF evaluation value commensurate with the amount of contrast within a focus detection region in the shot image and an AE evaluation value commensurate with the brightness of the shot image, and transmits these to the CPU 23. According to the AF evaluation value, the CPU 23 adjusts via the driver 34 in FIG. 2 the position of the focus lens 31 thereby to focus the optical image of the subject on the image-sensing device 33. Also, according to the AE evaluation value, the CPU 23 adjusts via the driver 34 shown in FIG. 2 the degree of aperture of the aperture stop 32 (and also, as necessary, the amplification factor of the signal amplification by the AFE 12) thereby to control the amount of light received (the brightness of the image).

A microphone 14 converts sound (voice) fed from outside into an analog audio signal and feeds it out. An audio signal processor 15 converts the analog audio signal fed out from the microphone 14 into a digital audio signal. The digital audio signal is then fed to the compression processor 16.

The compression processor 16 compresses the video signal from the video signal processor 13 by a predetermined compression method. During the shooting and recording of a moving or still image, the compressed video signal is fed to the memory card 18 to be recorded to it. The compression processor 16 also compresses the audio signal from the audio signal processor 15 by a predetermined compression method. During the shooting and recording of a moving image, the video signal from the video signal processor 13 and the audio signal from the audio signal processor 15 are compressed in a fashion temporally associated with each other and are then in their compressed form recorded in the memory card 18.

The image-sensing apparatus 1 operates in different operation modes, including shooting mode, in which a moving or still image can be shot and recorded, and playback mode, in which a moving or still image stored in the memory card 18 can be played back and displayed on a display portion 27. As the operation keys 26c are operated in predetermined manners, the different modes are switched. As the record button 26a is operated, the shooting and recording of a moving image is started and stopped. As the shutter release button 26b is operated, the shooting and recording of a still image is executed.

In shooting mode, shooting is performed sequentially at a predetermined frame period (e.g. 1/60 seconds). In shooting mode, when the user presses the record button 26a, under the control of the CPU 23 the video signal of each of the frames following the pressing of the record button 26a is, along with the corresponding audio signal, sequentially recorded via the compression processor 16 in the memory card 18. When the record button 26a is pressed once again, the shooting of a moving image is ended; that is, the recording of the video and audio signals to the memory card 18 is ended, and the shooting of one moving image is completed.

On the other hand, in shooting mode, when the user presses the shutter release button 26b, the shooting of a still image is performed. Specifically, under the control of the CPU 23 the video signal of a single frame after the pressing of the shutter release button 26b is, as a video signal representing a still image, recorded via the compression processor 16 in the memory card 18.

In playback mode, when the user operates the operation keys 26c in a predetermined manner, a compressed video signal representing a moving or still image recorded in the memory card 18 is fed to a decompression processor 19. The decompression processor 19 decompresses the video signal it has received and feeds the result to the video output circuit 20. In shooting mode, even without the record button 26a or the shutter release button 26b being pressed, one shot image after another is acquired at a predetermined frame period (e.g. 1/60 seconds). These shot images in particular are referred to as "through images". In shooting mode, the video signal of one through image after another is fed to the video output circuit 20 to offer a so-called preview image.

The video output circuit 20 converts the digital video signal fed to it into a video signal (e.g. an analog video signal) in a format displayable on the display portion 27 and feeds the result out. The display portion 27 is a display device such as a liquid crystal display, and displays an image according to the video signal fed out from the video output circuit 20.

In playback mode, when a moving image is played back, the compressed audio signal corresponding to the moving image recorded in the memory card 18 is fed to the decompression processor 19 as well. The decompression processor 19 decompresses the audio signal it has received and feeds the result to an audio output circuit 21. The audio output circuit 21 converts the digital audio signal fed to it into an audio signal (e.g. an analog audio signal) reproducible on a speaker 28 and feeds the result out to it. The speaker 28 from the audio signal from the audio output circuit 21 reproduces sound (voice) and feeds it to outside.

Figure 3:
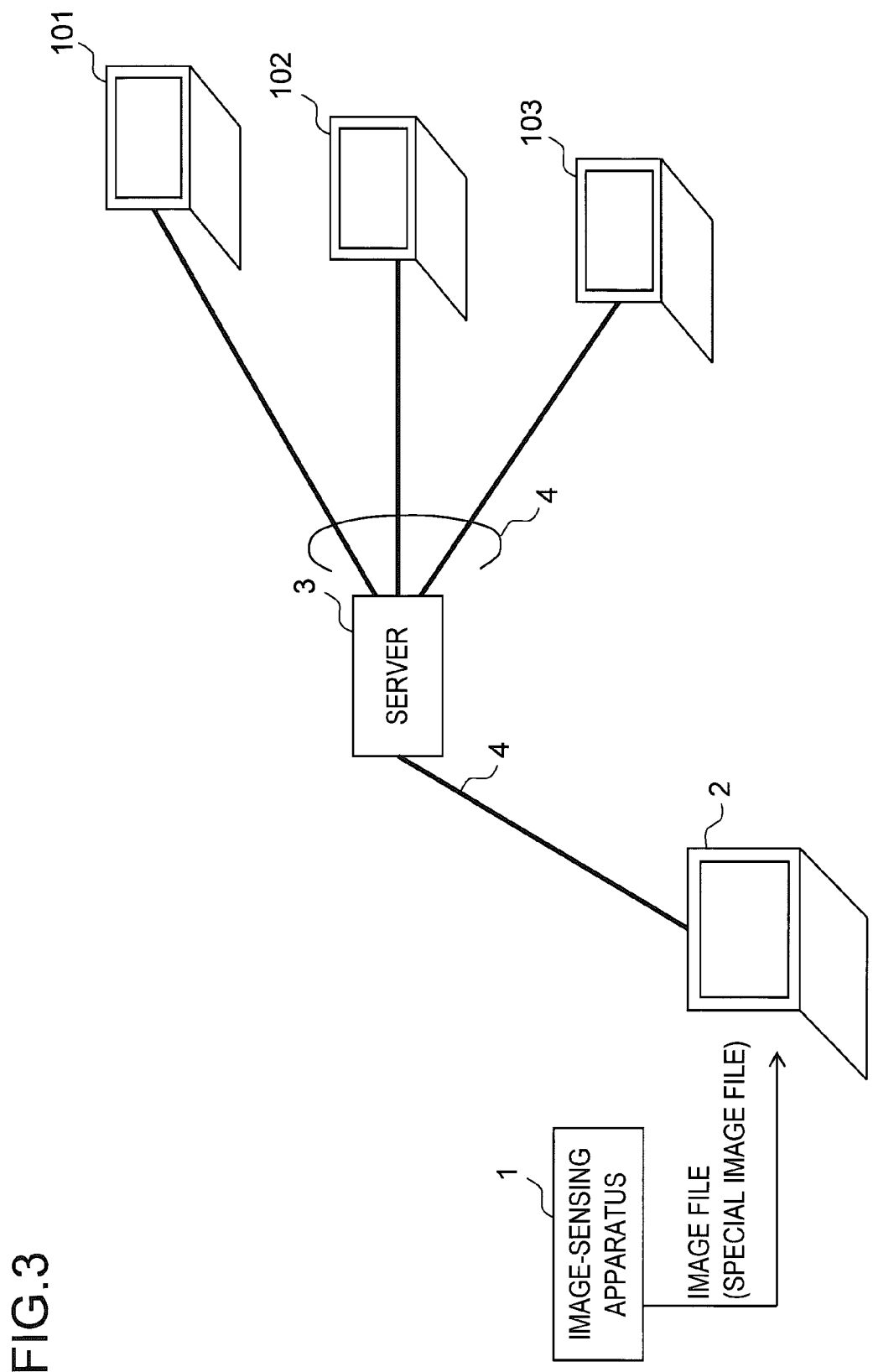
FIG. 3 is an overall configuration diagram of an image management system embodying the invention.

FIG. 3 is an overall configuration diagram of an image management system that operates in a characteristic manner in cooperation with the image-sensing apparatus 1. In FIG. 3, the reference sign 2 represents a computer of a user (hereinafter referred to as "user PC"), the reference sign 3 represents a server computer (hereinafter referred to simply as "server"), and the reference sign 4 represents a communications network as a computer network. Suppose here that the communications network 4 is the Internet. The reference signs 101, 102, and 103 each represent a computer (hereinafter referred to as "viewing PC") for the viewing of images, for instance, stored in the server 3.

Figure 4:
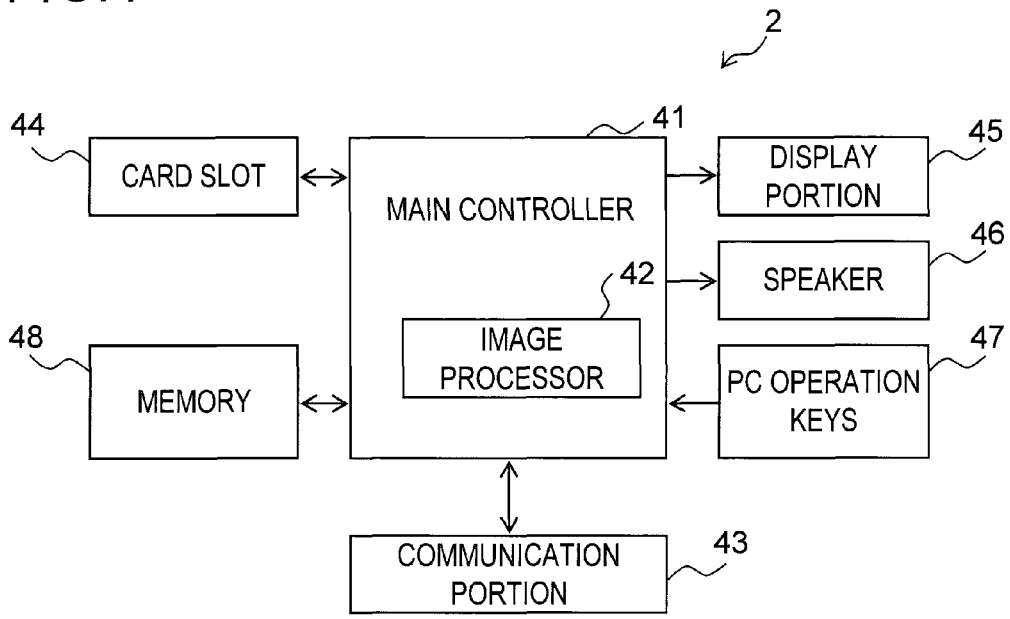
FIG. 4 is an outline internal block diagram of the user PC in FIG. 3.
Figure 5:
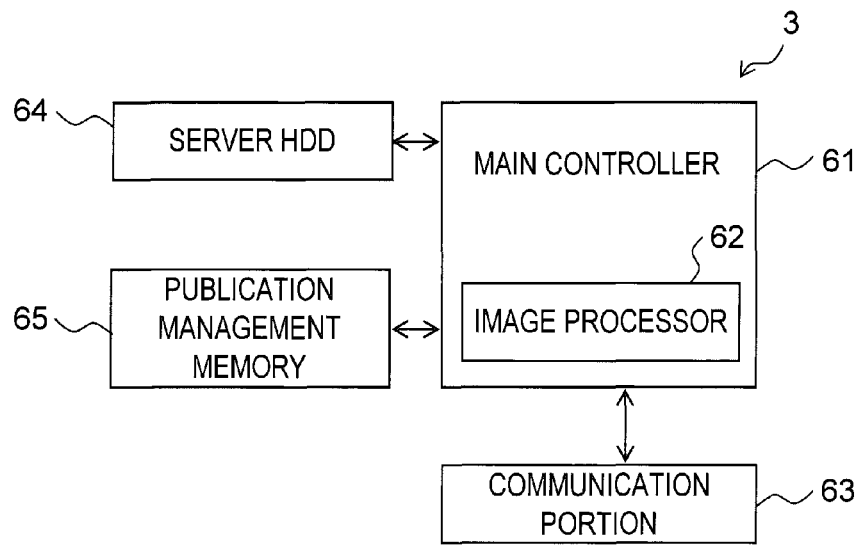
FIG. 5 is an outline internal block diagram of the server in FIG. 3.

FIG. 4 is an outline internal block diagram of the user PC 2. The user PC 2 is provided with blocks referred to by the reference signs 41 to 48. FIG. 5 is an outline internal block diagram of the server 3. The server 3 is provided with blocks referred to by the reference signs 61 to 65. Each of the viewing PCs 101 to 103 is configured like the user PC 2, and is provided with a display portion (unillustrated) such as a liquid crystal display, etc. The user PC 2 and the server 3 can exchange data with each other freely over the communications network 4, and each of the viewing PCs 101 to 103 and the server 3 can exchange data with each other freely over the communications network 4. For the sake of simplicity in drawings and convenience of description, FIG. 3 shows only three viewing PCs; in practice many more viewing PCs like the viewing PCs 101 to 103 may be connected to the server 3 over the communications network 4.

The image-sensing apparatus 1 creates an image file corresponding to each shot still or moving image, and this image file is recorded in the memory card 18. The image file may be a special image file as will be described later. The memory card 18 is detachably attached to the image-sensing apparatus 1. When the memory card 18 is detached from the image-sensing apparatus 1 and inserted into a card slot 44 of the user PC 2 in FIG. 4, the user PC 2 can read out image files recorded in the memory card 18. Instead, image files recorded in the memory card 18 in its state attached to the image-sensing apparatus 1 can be read into the user PC 2 across a communications line complying with a standard such as USB (Universal Serial Bus). An image file so read into the user PC 2 is fed to a main controller 41, which includes an image processor 42. Under the control of the main controller 41a display portion 45 such as a liquid crystal display displays the image and a speaker 46 reproduces sound. The contents stored in a memory 48 is consulted by the main controller 41.

When PC operation keys 47 in FIG. 4 are operated in a predetermined manner, the image file fed to the main controller 41 is transmitted (as commonly called, uploaded) to a main controller 61, which includes an image processor 62, of the server 3 in FIG. 5. This transmission is conducted, via a communication portion 43 in FIG. 4 and a communication portion 63 in FIG. 5, over the communications network 4 in FIG. 3. The image file received by the main controller 61 is saved, in association with information characteristic of the user PC 2, in a server HDD (hard disk) 64.

The server 3 is a WWW (world-wide web) server to which a predetermined IP address is allocated on the Internet, and manages SNSs (social network services) and web sites such as so-called blogs.

The server 3 accepts transmission requests (delivery requests) from each of the viewing PCs 101 to 103 over the communications network 4. When the server 3 receives from the viewing PC 101*a* transmission request for an image file stored in the server HDD 64, or a web page containing that image file, the server 3 determines what data to transmit based on the contents of the image file and what is stored in a publication management memory 65, and transmits the determined data to the viewing PC 101 (the details will be described later). The same applies to the viewing PCs 102 and 103. As the publication management memory 65, part of a storage area within the server HDD 64 may be used.

In the image-sensing apparatus 1 of FIG. 1, it is possible, by operating the operation keys 26*c* in a predetermined manner, to select a special recording method as the method by which images are recorded to the memory card 18. When the special recording method is selected, the image-sensing apparatus 1 operates in a peculiar manner to create and save (record) a characteristic image file. This characteristic image file in particular will be called the "special image file". Unless otherwise stated, the following description deals with operations performed when the special recording method is selected. The special recording method is useful for protection of right-of-portrait, copyright, privacy, etc. and for preservation of confidentiality of secret information.

Now, as practical examples in illustration of the operation of the whole or part of the image management system shown in FIG. 3, or of related operations, Examples 1 to 9 will be described. Unless inconsistent, or unless otherwise stated, features of different examples may be combined together in any way in practice.

EXAMPLE 1

Example 1 will be described below. First, the image processing performed in the image-sensing apparatus 1 when the special recording method is selected will be described. Here it is assumed that the a person's face is handled as the target of protection of privacy.

Figure 6:
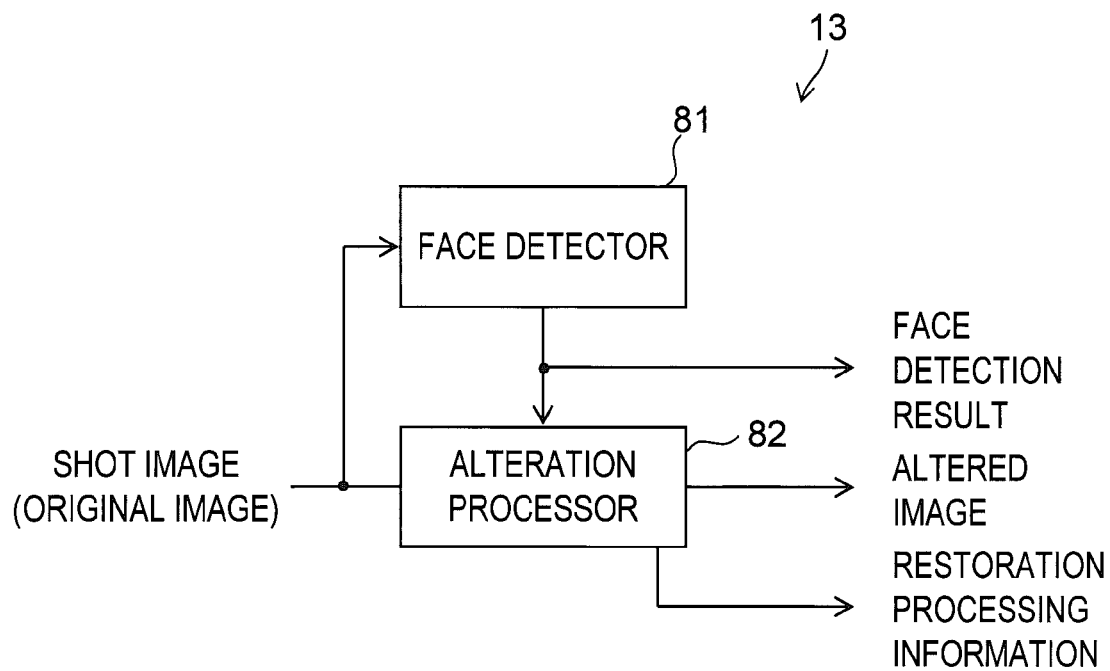
FIG. 6 is a partial internal block diagram of the video signal processor in FIG. 1.

The image-sensing apparatus 1 of FIG. 1 is equipped with a face detection function. The face detection function is achieved by a face detector within the video signal processor 13 in FIG. 1. FIG. 6 is a partial internal block diagram of the video signal processor 13 in FIG. 1. The video signal processor 13 includes a face detector 81 and an alteration processor 82.

The face detector 81 receives as an input image each shot image from the image-sensing portion 11, and based on the image data of the input image detects a person's face from the input image eventually to extract a face region including the face. Various methods are well known to detect a face included in an image, and the face detector 81 may adopt any of those. For example, the method described in JP-A-2000-105819 may be adopted, according to which a skin-colored region is extracted from an input image thereby to detect a face (face region). For another example, the method described in JP-A-2006-211139 or JP-A-2006-72770 may be adopted to detect a face (face region).

Typically, for example, the image in a region of interest set in the input image is compared with a reference face image having a predetermined image size to evaluate the similarity between the two images and based on the similarity it is checked whether or not the region of interest includes a face (whether or not the region of interest is a face region). The evaluation of similarity is achieved through the extraction of characteristic quantities effective in recognizing a face. Examples of such characteristic quantities include horizontal edge, vertical edge, right-up oblique edge, left-up oblique edge, etc.

In the input image, the region of interest is shifted one pixel at a time in the left/right or up/down direction. The shifted region of interest is then compared with the reference face image to once again evaluate the similarity between the two image and check for a face. In this way, the region of interest is renewed every time it is shifted one pixel, for example, in the direction from top left to bottom right in the input image. Moreover, the input image is reduced at a predetermined factor of reduction, and similar face detection is performed on the reduced image. Through the repetition of these operations, it is possible to detect a face of any size from the input image.

The face detection result fed out from the face detector 81 is fed to the alteration processor 82. The alteration processor 82 alters the shot image from the image-sensing portion 11 according to the face detection result, and feeds out the resulting image as an altered image. For clearer distinction from the altered image, the unaltered shot image obtained by the shooting by the image-sensing portion 11 will be called the "original image" in the following description.

Now consider one original image of interest. FIG. 7A shows the original image 300 of interest. The original image 300 shows two persons 301 and 302. The person 301 on the left in the image is male, and the person 302 on the right in the image is female. The regions indicated by the reference signs 311 and 312 are the face regions extracted for the persons 301 and 302 respectively.

According to the face detection result fed out from the face detector 81, the position and size are identified of a face region that the face detector 81 has extracted from the original image (it is assumed that, by the size, the width and the height are identified). In a case where a plurality of face regions have been extracted, the face detection result contains information that identifies the position and size of each of the face regions. Although the example under discussion deals with a case where the face region is rectangular in shape, the face region may instead have any shape other than rectangular (it may be, for example, elliptic or circular in shape). In this Example, any face region detected by the face detector 81 is taken as an "alteration target region" to be altered by the alteration processor 82. In the example shown in FIG. 7A, the face regions 311 and 312 are each taken as an alteration target region (there are thus two alteration target regions).

Figure 7B:
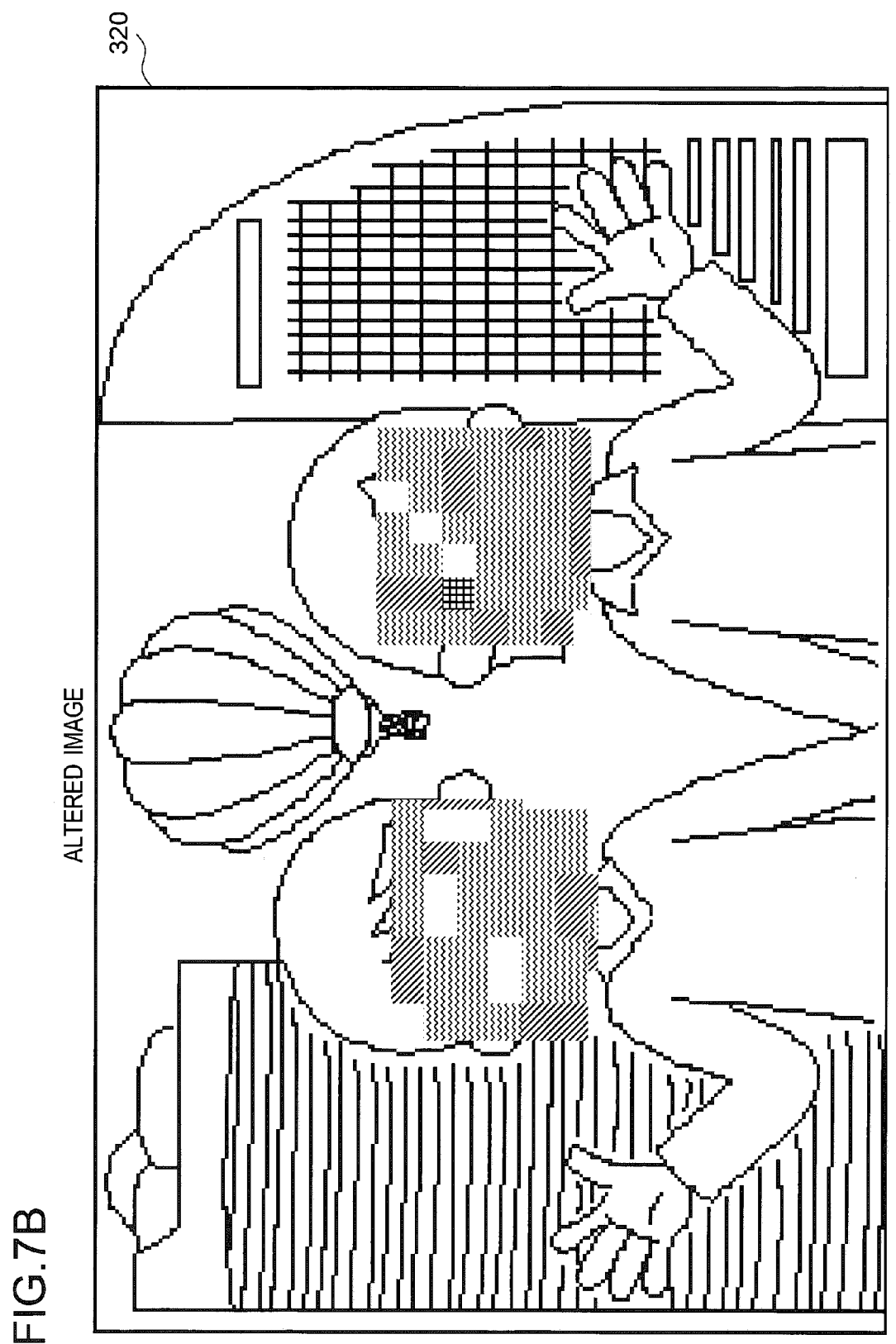
FIG. 7B is a diagram showing an example of an altered image fed out of the alteration processor in FIG. 6.

The alteration processor 82 applies predetermined alteration to every alteration target region in the original image fed to it, the alteration being applied to no other region than an alteration target region. FIG. 7B shows an altered image 320 obtained by applying the alteration to the original image 300 of FIG. 7A. In the altered image 320, alteration has been applied such that who the persons 301 and 302 are cannot be recognized by face.

The alteration applied by the alteration processor 82 may be any of various kinds of alteration, provided that it is reversible.

Examples of the alteration applied by the alteration processor 82 include: glassification, negative-positive inversion, XOR 0x80 operation, RGB shuffling, Win masking, Meko masking, Q0 masking, FL masking, CP masking, etc. These are different kinds of masking, and some of them are grouped into pixelization. In pixelization, for example, an alteration target region is divided in both the vertical and horizontal directions into regions at intervals of a predetermined number of pixels, and the divided regions are rearranged randomly.

Glassification includes horizontal and vertical glassification. In horizontal glassification, an alteration target region is divided in the vertical direction into regions at intervals of a predetermined number of pixels, and the divided regions are shuffled so that they take different-from-the-original positions in the up/down direction. In vertical glassification, an alteration target region is divided in the horizontal direction into regions at intervals of a predetermined number of pixels, and the divided regions are shuffled so that they take different-from-the-original positions in the left/right direction. Horizontal and vertical glassification may be applied in combination.

In negative-positive inversion, the bits of the RGB signals inside an alteration target region are inverted. In a case where the video signals inside the alteration target region are in the YUV format, they are first converted into RGB signals and are then subjected to negative-positive inversion.

In XOR 0x80 operation, the exclusive OR between every signal value of the RGB signals inside an alteration target region and the value 0x80 (80H) in hexadecimal notation is calculated, and the resulting exclusive OR values are fed out.

In RGB shuffling, the signal values of the RGB signals inside an alteration target region are shuffled among R, G, and B signals.

In Win masking, an alteration target region is divided in the vertical direction into regions at intervals of a predetermined number of pixels, and the divided regions are shuffled according to a predetermined rule.

In Meko masking, an alteration target region is divided in both the vertical and horizontal directions into regions at intervals of a predetermined number of pixels, and the divided regions are rearranged randomly; then negative-positive inversion is applied in addition.

In Q0 masking, horizontal glassification, vertical glassification, negative-positive inversion, etc. are applied in combination.

In FL masking, an alteration target region is divided in both the vertical and horizontal directions into regions at intervals of a predetermined number of pixels, and the divided regions are rearranged in a spiral.

In CP masking, an alteration target region is divided in both the vertical and horizontal directions into regions at intervals of a predetermined number of pixels, and the divided regions are rearranged. Here, how they are rearranged is determined according to the number of divided regions and a string of a predetermined number or less of alphabet letters Accordingly, restoring the original image requires the same string of alphabet letters. Using CP masking thus permits image management by use of such strings of alphabet letters along with authentication codes, which will be described later. For example, in an apparatus (such as the image-sensing apparatus 1 or the user PC 2) equipped with the function of restoring an original image from an altered image, it is possible to introduce a scheme in which an original image is not restored unless the user of the apparatus feeds into it the corresponding string of alphabet letters.

As yet another alternative, it is also possible, for example, to shuffle the bit strings of the video signals inside an alteration target region randomly.

Since the alteration applied by the alteration processor 82 is reversible, it is possible, through restoration corresponding to the alteration, to completely restore an original image from an altered image. Generating restoration processing information, i.e. information needed to execute the restoration, also is the task of the alteration processor 82 (or the CPU 23 etc. in FIG. 1). The restoration processing information can be said to be information that identifies what alteration was applied to an alteration target region. In a case where the alteration applied by the alteration processor 82 includes the rearrangement of divided regions, signal values, or bit strings, the restoration processing information needs to contain information on how they are rearranged; this information may be encrypted before being incorporated into the restoration processing information.

What alteration the alteration processor 82 applies can be set by the user operating the operation keys 26*c* in FIG. 1 in predetermined manners. Here the intensity and other parameters of the alteration can be set. In a case where no such settings are made explicitly, the image-sensing apparatus 1 applies prescribed alteration automatically. The intensity of alteration is an indicator of the degree to which the image inside an alteration target region is altered from the corresponding part of the original image, and can be read as the degree of alteration. By setting the intensity of alteration, it is possible to set, for example, the size of the regions divided by glassification.

Figure 8:
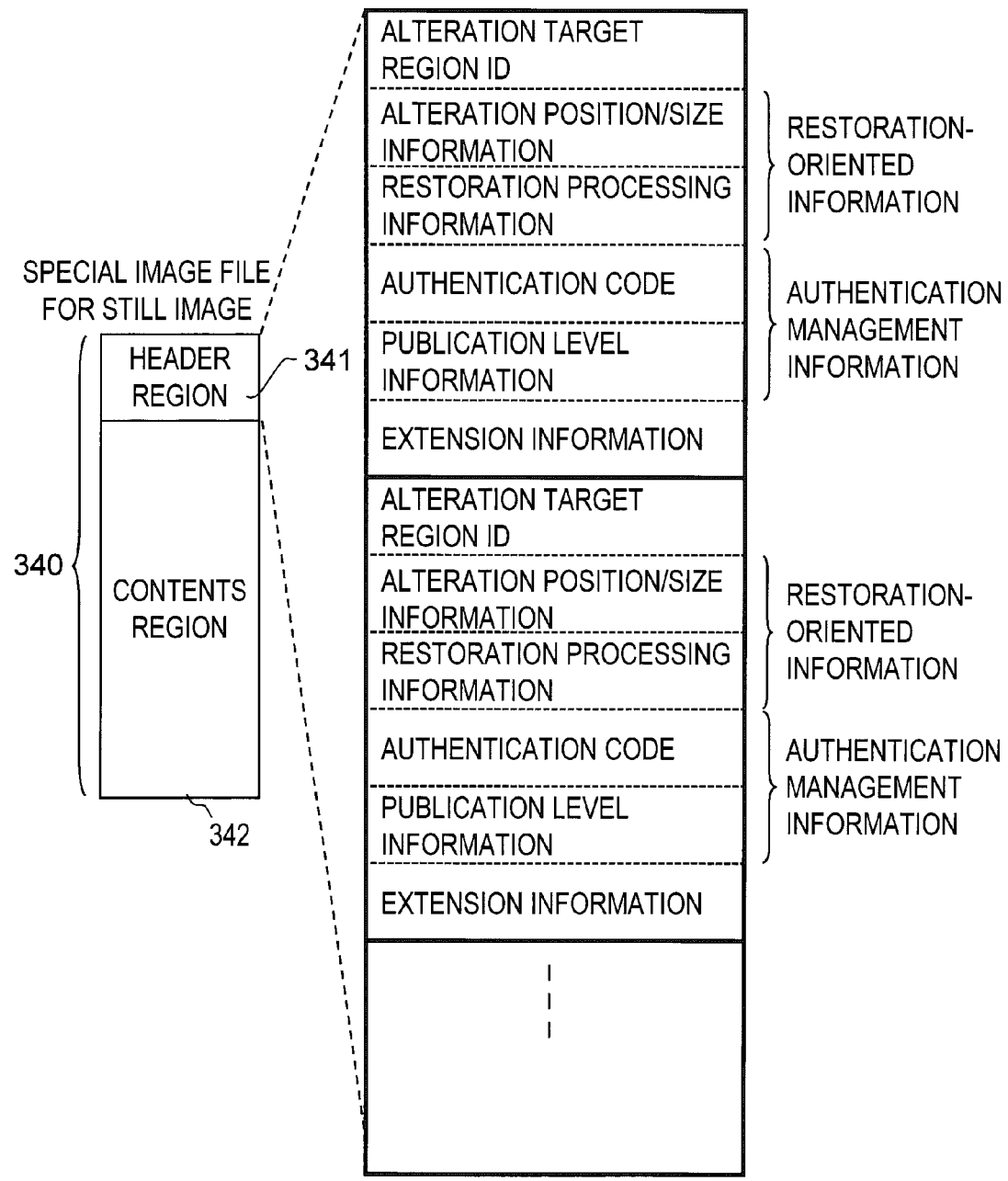
FIG. 8 is a diagram showing the data structure of a special image file for a still image which is created and saved in the image-sensing apparatus of FIG. 1.

FIG. 8 shows the data structure of the special image file 340 created and recorded to the memory card 18 when the shutter release button 26*b* in FIG. 1 is pressed. This special image file 340 is one for a still image, and is created within the image-sensing apparatus 1 under the control of the CPU 23.

The special image file 340 is composed of a header region 341 and a contents region 342. Naturally the head region and contents region defined within a single special image file are associated with each other. In the case of the special image file 340, the header region 341 and contents region 342 are associated with each other, and the different pieces of data stored within the special image file 340 are associated with one another.

In the contents region 342, the image data representing the altered image is stored. This image data is compressed data as a compressed video signal obtained by compressing the altered image with the compression processor 16 in FIG. 1. The special image file 340 including the contents region 342 does not contain any of the image data of the original image. In the header region 341, information related to an alteration target region etc. are stored. Specifically, for an alteration target region in the original image corresponding to the special image file 340, there are created an alteration target region ID, alteration position/size information, restoration processing information, an authentication code, publication level information, and extension information, and these are stored in the header region 341. Here, in a case where there are a plurality of alteration target regions, for each of them, there are created an alteration target region ID, alteration position/size information, restoration processing information, an authentication code, publication level information, and extension information.

For the sake of concreteness of description, consider here a case in which the special image file corresponding to the original image 300 of FIG. 7A is the special image file 340. In this case, for each of the face regions 311 and 312 in FIG. 7A, there are stored in the header region 341 an alteration target region ID, alteration position/size information, restoration processing information, an authentication code, publication level information, and extension information.

An alteration target region ID is basically a serial number assigned uniquely to each alteration target region. In the example under discussion, the region 311 as a first alteration target region and the region 312 as a second alteration target region are assigned, for example, the serial numbers "1" and "2" respectively. In a case where an alteration target region is a face region, its alteration target region ID may further include property information indicating the person's sex, age, race, etc. On the image-sensing apparatus 1, or on the user PC 2 (see FIG. 3) that has received the special image file 340, those items of property information can be set manually for each alteration target region.

Alteration position/size information is information that identifies the position and size of an alteration target region in an image. It is assumed that, in a case where an alteration target region is a rectangular region, by its size, the width and height of that alteration target region are identified. In the example under discussion, since the face regions 311 and 312 are both alteration target regions, their alteration position/size information identifies the position and size of each face region in the image as known based on the face detection result from the face detector 81 in FIG. 6. The alteration position/size information on the face region 311 indicates the position and size of the face region 311 in the original image 300 and in the altered image 320. The same applies to the face region 312. In a case where an alteration target region is not rectangular, its alteration position/size information may include information that identifies the shape of that alteration target region.

The restoration processing information in the header region 341 is the same as that generated by the alteration processor 82. Based on restoration processing information, which identifies what alteration was applied to an alteration target region, and alteration position/size information, which identifies the position and size of an alteration target region in an image, it is possible to restore an original image from an altered image. Thus, alteration position/size information and restoration processing information together forms restoration-oriented information that identifies the restoration processing to be performed to restore an original image from an altered image.

Different alteration target regions typically share identical restoration processing information, but may have different restoration processing information. For example, a configuration may be adopted in which what alteration to make the alteration processor 82 apply can be set for each alteration target region (each of the face regions 311 and 312) by use of the operation keys 26c every time a special image file 340 is created and saved. In that case, for example, suppose that, after the original image 300 is acquired, when the special image file 340 is generated, settings are made such that negative-positive inversion is applied to the face region 311 and RGB shuffling is applied to the face region 312. Then alteration according to the settings is applied to the original image 300, and the resulting altered image is stored in the contents region 342 in the special image file 340; in addition, in the header region 341 of the special image file 340, restoration processing information corresponding to positive-positive inversion is stored as restoration processing information for the face region 311, and restoration processing information corresponding to RGB shuffling is stored as restoration processing information for the face region 312.

An authentication code and publication level information are authorization management information for switching whether to permit or prohibit (or partially permit) an operation to make an original image viewable by restoring it from an altered image according to restoration-oriented information. An example of use of an authentication code and publication level information will be given later.

Extension information is additional information that the user can add; the user can store various kinds of information as additional information in the header region 341.

An authentication code and publication level information can be set differently for each alteration target region. For example, they may be set differently for each alteration target region by use of the operation keys 26c when the special image file 340 is created and saved. In a case where no such settings are made with respect to an authentication code and publication level information, the image-sensing apparatus 1 automatically writes to the header region 341 initial data prescribed as an authentication code and publication level information. Extension information can also be set differently for each alteration target region.

The data save format in the header region and that in the entire special image file may be determined freely; instead, data may be saved in a format complying with an existing standard, such as Exif (Exchangeable image file format). There are also standards, like DCF (Design rule for Camera File system), for image file systems for recording or playback appliances, and it is also possible to adapt the data save format in the header region and that in the entire special image file to an existing standard such as DCF.

For example, in a case where the special image file is created to comply with the Exif file format, it is possible to view the image contained in the special image file on any software program complying with the Exif file format. However, since pixelization or the like was applied when the special image file was saved on the image-sensing apparatus 1, that is, the image contained in the special image file is an altered image, even if the memory card 18 is lost or stolen, or if the special image file leaks out over the Internet by a computer virus, abuse of file exchange software, etc., privacy is protected (in the example under discussion, a person's face in the altered image cannot be identified, and thus privacy is protected).

Moreover, as distinct from conventional methods (see, for example, JP-A-2002-10063), it is possible, by use of restoration-oriented information, to restore an original image from an altered image. In addition, by use of authorization management information, it is possible to manage the authorization to restore an original image and to view a restored image (an example of a method for this management will be described later in connection with another example).

It is assumed that the user PC 2 and the server 3 in FIG. 3 comply with the special image file. That is, in the entire image management system including the image-sensing apparatus 1, the user PC 2, and the server 3 in FIG. 3, the data save format in the header region and that in the entire special image file are prescribed.

EXAMPLE 2

Next, Example 2 will be described. Example 1 has dealt with a case where, by use of the face detector 81 in FIG. 6, a face region in an original image is taken as an alteration target region. An alteration target region, however, may be other than a face region. In general terms, a specific region detector (unillustrated) that, based on the image data of an original image, detects from the original image a region having specific image characteristics may be provided within the video signal processor 13 in FIG. 1, and an alteration target region may be determined from the region detected by the specific region detector. Normally the region detected by the specific region detector is as it is taken as an alteration target region. In example 1, the specific region detector corresponds to the face detector 81 in FIG. 6, the specific image characteristics correspond to those of a face, and the region detected by the specific region detector corresponds to a face region (the face regions 311 and 312 in FIG. 7A).

In an original image, a region having specific image characteristics may be, for example, a region including a person's face (i.e. a face region mentioned above) a region including, a particular kind of object (such as a machine under development in utmost secrecy), a region including particular characters (such as the title of a top secret document), or a region including a particular design (such as the design of clothes under development). These are all regions that should not be put open to the general public for reasons of privacy etc.

Any well-known method may be adopted to detect, based on the image data of an original image, a region having specific image characteristics from the original image. For example, a reference image representing a particular kind of object is previously stored in a memory (unillustrated) within the image-sensing apparatus 1, and by pattern matching or the like, an original image is compared with the reference image; this makes it possible to automatically detect a region including a specific kind of object. In similar manners, it is possible to detect a region including a person's face, a region including particular characters, and a region including a specific design.

On the image-sensing apparatus 1 or on the user PC 2, an alteration target region may be set by manual operation. For example, a configuration may be adopted in which, on the image-sensing apparatus 1, when a special image file is created and saved, an alteration target region can be set freely by manual setting by use of the operation keys 26*c*. Then, after an original image is acquired, when the special image file corresponding to that original image is generated, an alteration target region is determined by the user's manual setting, then alteration is applied to the alteration target region determined by manual setting, and a special image file corresponding to that alteration is stored in the memory card 18 within the image-sensing apparatus 1. In this case, naturally, the contents of the header region reflect the alteration target region determined by manual setting.

Manual setting of an alteration target region is possible even after a special image file has been created and saved. In this case, according to the alteration target region determined newly by manual setting performed after file creation/saving, the image data in the contents region, and the restoration-oriented information etc. in the header region, of the special image file are renewed. Furthermore, such manual setting of an alteration target region performed after file creation/saving is possible not only on the image-sensing apparatus 1 but also on the user PC 2 (FIG. 3) that has received a special image file from the image-sensing apparatus 1 (manual setting can be performed by use of the PC operation keys 47 in FIG. 4). If the image-sensing apparatus 1 or the user PC 2 is equipped with a touch panel function, an alteration target region may be set manually by operation via the touch panel.

For example, in the case of the original image 300 of FIG. 7A, the face region 311 may be excluded from the alteration target region so that the face region 312 alone is taken as an alteration target region.

A configuration may be adopted in which, when or after a special image file is created and saved on the image-sensing apparatus 1, the authentication code and publication level information in the header region of the special image file can be set freely on the image-sensing apparatus 1 or on the user PC 2.

EXAMPLE 3

There are cases where it is not a person's face but the background against which the person appears that should not be put open to the public. In this case, pixelization or the like may be applied to a background region excluding a person's face. This will now be described as Example 3. This Example is useful in cases where, for example, the site of shooting should not be identified by the public, or a piece of furniture or other object appearing in the background of a shot should not be exposed to the public eye.

To achieve that, on the image-sensing apparatus 1, when a special image file is created and saved, the user, by use of the operation keys 26*c* etc., feeds in a command to take a background region as an alteration target region. This command is transmitted via the CPU 23 in FIG. 1 to the alteration processor 82 in FIG. 6. In this case, the alteration processor 82 handles as an alteration target region a background region excluding a face region detected by the face detector 81, then applies predetermined alteration to the background region in an original image, and thereby produces an altered image. The image data of the altered image obtained by applying alteration to the background region is stored in the contents region of the special image file to be created and saved at the press of the shutter release button 26*b* on the image-sensing apparatus 1, and restoration-oriented information corresponding to the alteration applied to the background region is stored in the header region of that special image file (see FIG. 8).

Figure 9:
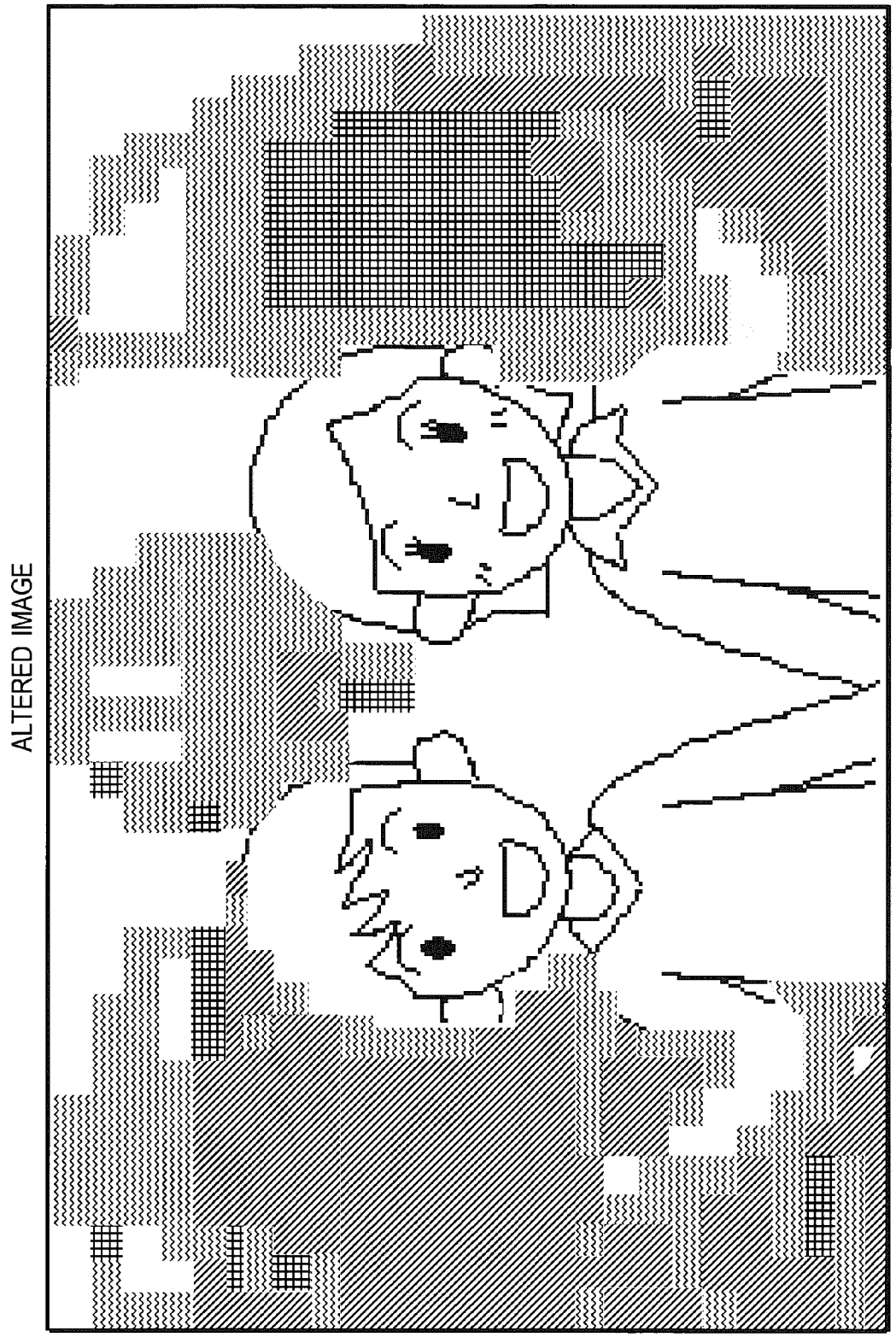
FIG. 9 is a diagram showing another example of an altered image generated by the alteration processor in FIG. 6.

An example of an altered image obtained by applying alteration to a background region as mentioned above in the original image 300 of FIG. 7A is shown in FIG. 9. FIG. 9 shows an altered image obtained when a region excluding a face region and an area close around it are handled as an alteration target region.

In a case where a background region is set as an alteration target region, for example, information to that effect is stored as extension information in the header region in FIG. 8. Instead, in the header region, a region for storing information indicting whether an alteration target region is a face region or a background region may be provided separately from that for storing extension information.

EXAMPLE 4

Next, Example 4 will be described. Example 4 will deal with an example of a method whereby a special image file created on the image-sensing apparatus 1 is put open to public (published) via the server 3 in FIG. 3.

For the sake of concreteness of description, consider here a case where the special image file created on the image-sensing apparatus 1 and uploaded (i.e. transmitted) via the user PC 2 to the server 3 is the special image file 340 of FIG. 8 described in connection with Example 1 and where the altered image stored in the contents region 342 of the special image file 340 is the altered image 320 of FIG. 7B. As described in connection with the Example 1, the altered image 320 is an altered image obtained by applying predetermined alteration to the face regions 311 and 312 in the original image 300 of FIG. 7A. Needless to say, in the header region 341 of the special image file 340 dealt with in this Example, as described in connection with Example 1, the restoration-oriented information needed to restore the original image 300 from the altered image 320 is stored (see FIG. 8).

It is assumed that, according to the prescriptions of an SNS or web site that the server 3 manages, the user PC 2 and the viewing PCs 101 to 103 are each previously assigned an individual ID number. In the publication management memory 65 (see FIG. 5) of the server 3, there are previously stored those ID numbers along with publication management relationship information indicating the relationship between the user PC 2 and each of the viewing PCs 101 to 103. A relationship indicated by the publication management relationship information will be, in the following description, referred to as a "publication relationship". An individual ID number is the ID number assigned to the user of the user PC 2 or of any viewing PC; for example, the server 3 issues in advance an ID number corresponding to the viewing PC 101, and when the user to whom that ID number is issued assigns it to a computer connectable to the server 3, that computer thereafter functions as the viewing PC 101. The same applies to the user PC 2 and the viewing PCs 102 and 103.

An example of the contents of the publication management relationship information is shown in FIG. 10. Suppose now that the publication relationships in which the user PC 2 is with the viewing PCs 101, 102, and 103 are a first, a second, and a third publication relationship respectively, and that it is these relationships that the publication management relationship information indicates. In practice, by use of the corresponding IDs, the server 3 recognizes publication relationships as shown in FIG. 10.

In an SNS or the like, it is generally possible to restrict the publication of each item of information that is going to be published. On a publisher-side PC (corresponding to the user PC 2), it is possible to freely set, for example, "to publish a given item of information to a viewing PC with an ID number corresponding to 'a friend' but not to a viewing PC with an ID number corresponding to 'a friend's friend' or "the general public". "The general public" denotes a status of neither 'a friend' or 'a friend's friend'. Accordingly, the first to third publication relationships are prescribed to suit the different levels of publication restriction available in the SNS or web site that the server 3 manages. It is here assumed that the first to third publication relationships are allocated to the levels of publication restriction for "a friend", "a friend's friend", and "the general public" respectively.

In this Example, the mode of publication is controlled according to the publication management relationship information and to the publication level information in the header region 341. As described above, the public level information in the header region 341 is set automatically by the image-sensing apparatus 1; alternatively it is set by the user on the image-sensing apparatus 1 or on the user PC 2. The special image file 340 is uploaded (i.e. transmitted) via the user PC 2 over the communications network 4 to the server 3, which then saves the special image file 340, in association with the ID number of the user PC 2, in the server HDD 64 (see FIG. 5). In practice, in most cases, a web page containing the special image file 340 is uploaded to the server 3 to be saved in the server HDD 64; for the sake of simplicity in description, however, here the special image file 340 alone is taken as of interest.

Consider now a case where, according to the publication level information, the mode of publication is classified into three levels. The publication level information in the header region 341 of the special image file 340 stored in the server HDD 64 is shown in FIG. 11. Suppose now that the publication level information prescribes that the viewing PCs having the first, second, and third publication relationships with the user PC 2 be given a first, a second, and a third authorization respectively. In this case, the main controller 61 of the server 3 in FIG. 5 gives the viewing PCs 101, 102, and 103 the first, second, and third authorizations respectively as the authorization to access the special image file 340 in the server HDD 64.

Under the above assumptions, a description will be given below of the operation of the server 3 and the image displayed on each of the viewing PCs when they attempt to access the special image file 340 in the server 3.

Figure 12A:
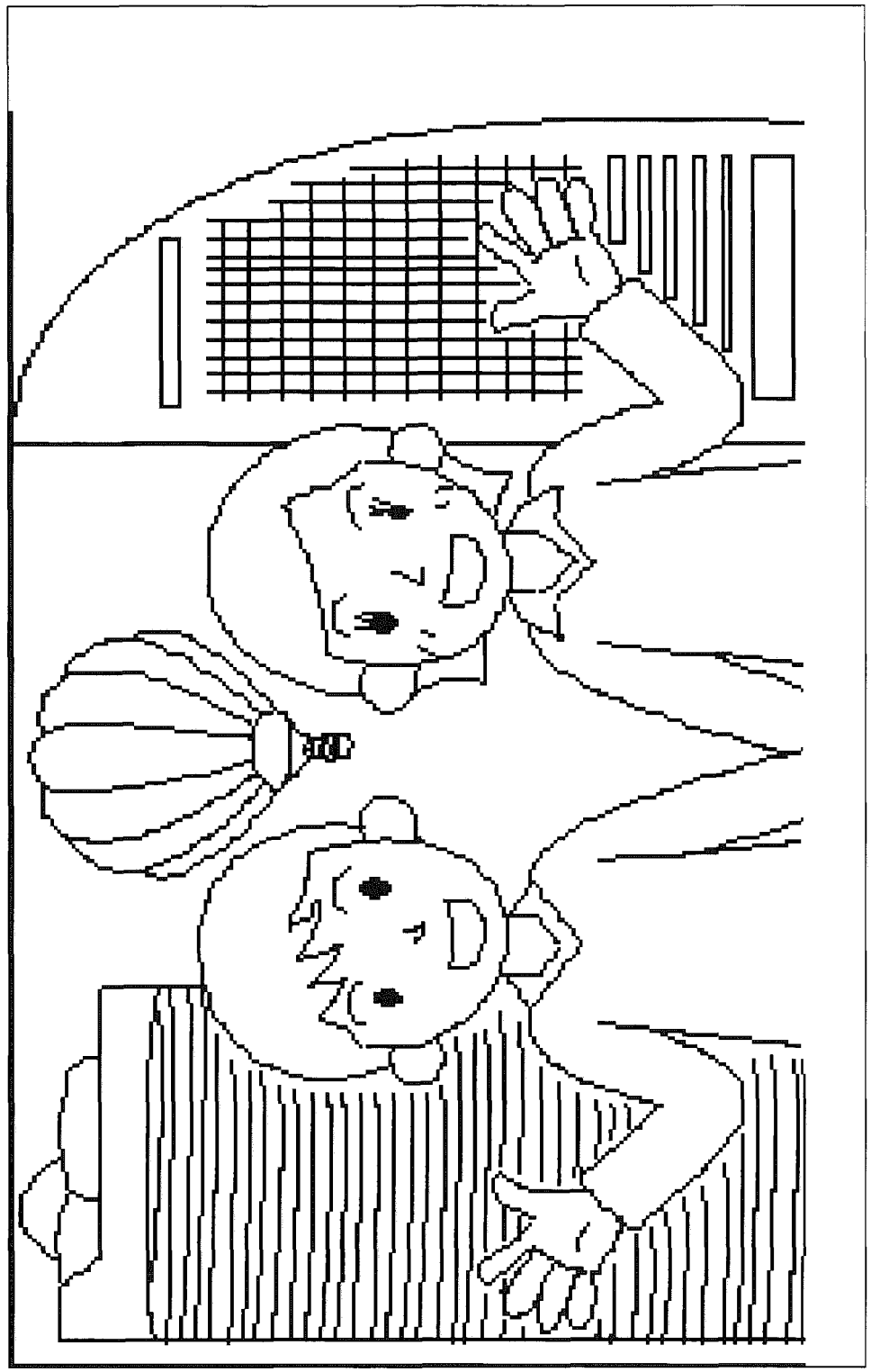

When the viewing PC 101 sends to the server 3 a transmission request to transmit the image corresponding to the special image file 340 in the server 3 to the viewing PC 101, the main controller 61 of the server 3, based on the publication level information of the special image file 340 in the server HDD 64 and the publication management relationship information in the publication management memory 65, recognizes the authorization to be given to the viewing PC 101. As described above, the authorization to be given to the viewing PC 101 is the first authorization. In this case, the image processor 62 (see FIG. 5) of the server 3 reads out from the server HDD 64 the altered image 320 and the restoration-oriented information in the special image file 340 and, based on the restoration-oriented information, restores the original image 300 from the altered image 320. The image processor 62 then transmits the image data representing the restored original image 300 to the viewing PC 101. As a result, on the display portion (unillustrated) provided in the viewing PC 101, an image as shown in FIG. 12A (i.e. the original image 300) is displayed.

When the viewing PC 103 sends to the server 3 a transmission request to transmit the image corresponding to the special image file 340 in the server 3 to the viewing PC 103, the main controller 61 of the server 3, based on the publication level information of the special image file 340 in the server HDD 64 and the publication management relationship information in the publication management memory 65, recognizes the authorization to be given to the viewing PC 103. As described above, the authorization to be given to the viewing PC 103 is the third authorization. In this case, the image processor 62 (see FIG. 5) of the server 3 reads out from the server HDD 64 the altered image 320 in the special image file 340 and, without performing restoration, transmits the image data representing the altered image 320 to the viewing PC 103. As a result, on the display portion (unillustrated) provided in the viewing PC 103, an image as shown in FIG. 12C (i.e. the altered image 320) is displayed.

Figure 12B:
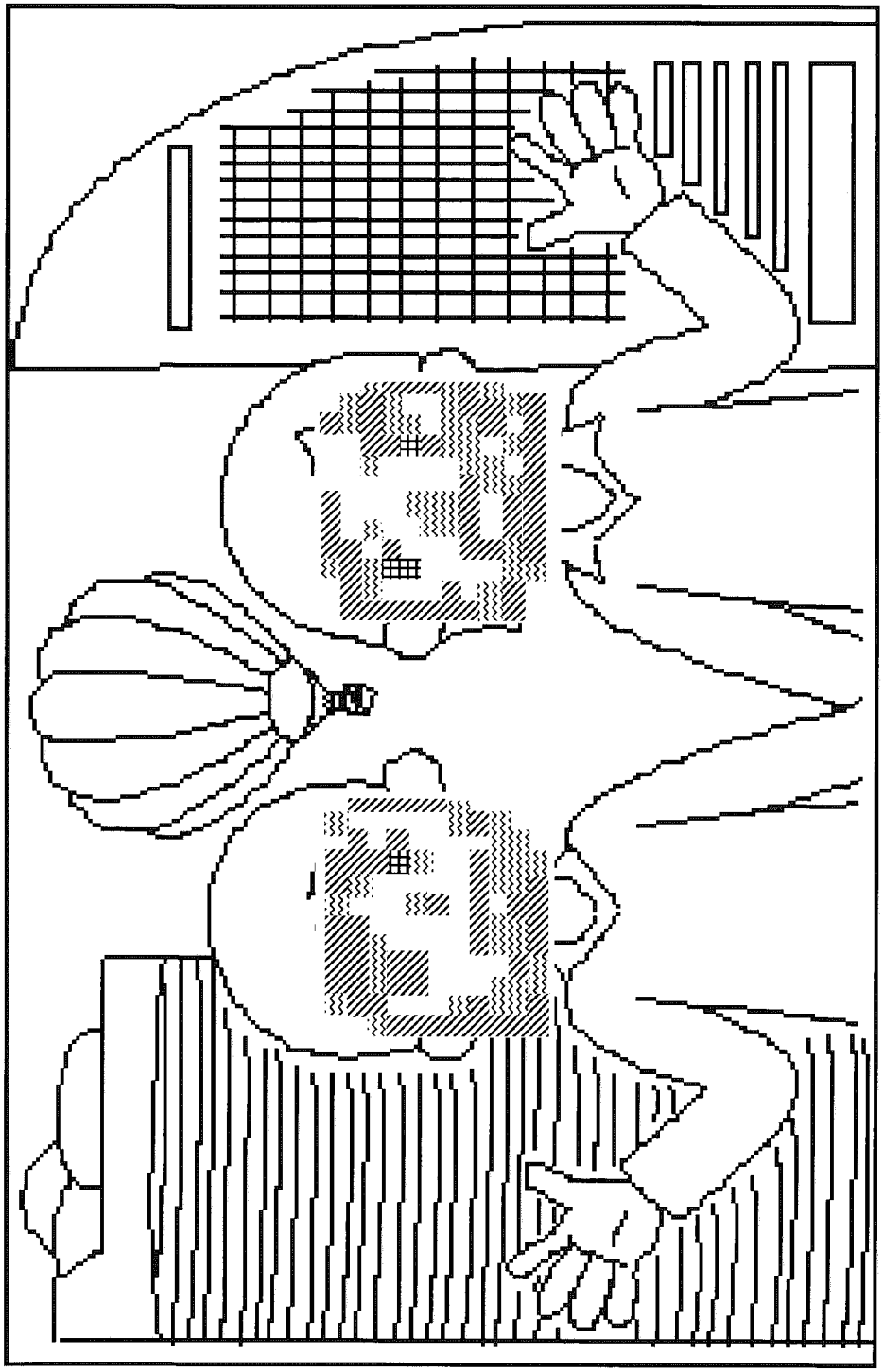

When the viewing PC 102 sends to the server 3 a transmission request to transmit the image corresponding to the special image file 340 in the server 3 to the viewing PC 102, the main controller 61 of the server 3, based on the publication level information of the special image file 340 in the server HDD 64 and the publication management relationship information in the publication management memory 65, recognizes the authorization to be given to the viewing PC 102. As described above, the authorization to be given to the viewing PC 102 is the second authorization. In this case, the image processor 62 (see FIG. 5) of the server 3 reads out from the server HDD 64 the altered image 320 and the restoration-oriented information in the special image file 340 and first, based on the restoration-oriented information, restores the original image 300 from the altered image 320; then the image processor 62 applies predetermined alteration to the face regions 311 and 312 in the original image 300 to generate a second altered image. The image processor 62 then transmits the image data representing this second altered image to the viewing PC 102. As a result, on the display portion (unillustrated) provided in the viewing PC 102, an image as shown in FIG. 12B (i.e. the second altered image) is displayed. On the image-sensing apparatus 1 or on the user PC 2, the information needed to convert the altered image 320 into the second altered image may be included in the restoration-oriented information; this eliminates the need to generate the original image 300 first.

The alteration applied to generate the second altered image may be any of the kinds of alteration that the alteration processor 82 of the image-sensing apparatus 1 can adopt. It should however be noted that the kind and/or intensity of the alteration applied to generate the second altered image from the original image 300 is made different from that applied to generate the altered image 320 so that the second altered image is different from the altered image 320. What alteration to apply to generate the second altered image is set previously in the entire image management system including the server 3 and the image-sensing apparatus 1; alternatively it is prescribed by the extension information in the header region 341. In the example under discussion, the intensity of alteration is less in the second altered image than in the altered image 320, making it easier to identify a person's face in the former.

Figure 13:
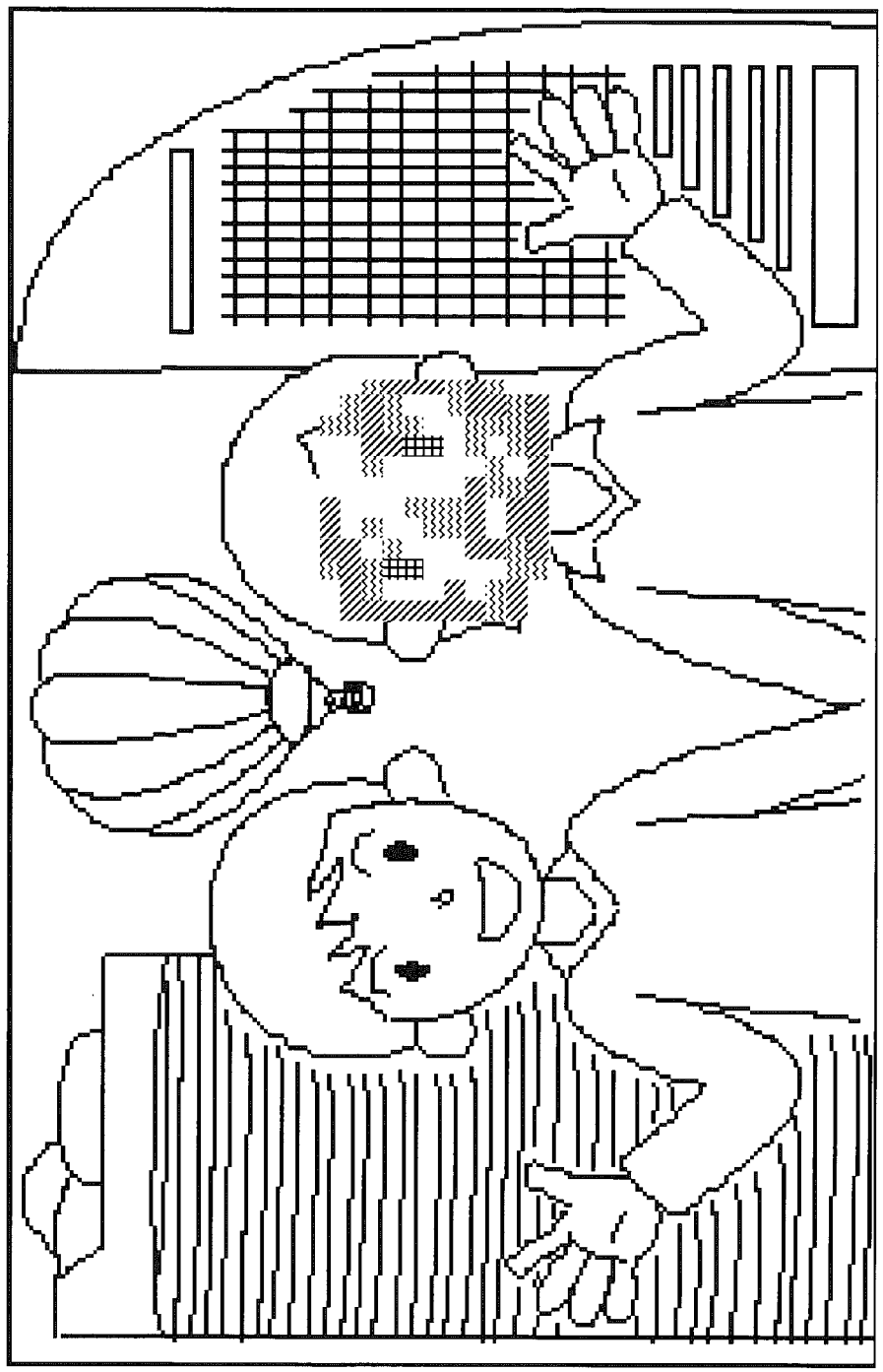
FIG. 13 is a diagram showing another example of an image that the server, on receiving a transmission request from the viewing PCs shown in FIG. 3, can transmit to them.

In a case where a female person's face should not be put open to the public, instead of the image shown in FIG. 12b, an image as shown in FIG. 13, for instance, may be generated as the second altered image. In the image of FIG. 13, alteration of relatively low intensity is applied to the region of a female person's face alone, with no alteration applied to the region of a male person's face.

In the manner described above, it is possible to introduce a scheme to protect the privacy of individuals appearing in images in SNSs and on web sites such as blogs. A publisher-side user can easily enjoy protection of privacy by simply setting publication level information (or by simply using the publication level information set automatically on the image-sensing apparatus 1).

It is possible to set alteration target regions and publication level information in detail at the publisher side but, as many settings a user wants to make, there is as much burden on the user. Since one usually wants to publish a large number of images, it is possible to reduce the burden on a user and increase practicality in the following manner. For example, in a case where a person's face is taken as the target of protection of privacy, the image-sensing apparatus 1 or the user PC 2 is first so operated that a face region is taken as an alteration target region and that publication level information as shown in FIG. 11 is automatically set; then a publisher-side user can thereafter upload special image files sequentially without having to perform hardly any operation for protection of privacy.

Other than publication control based on publication level information, it is also possible to exercise publication control by use of an authentication code. For example, in a case where the user of the user PC 2 wants to specially provide the original image 300 of the special image file 340 via the server 3 for the user of the viewing PC 103, who only has the third authorization, then the user of the user PC 2 furnishes, as a password, the authentication code in the header region 341 to the user of the viewing PC 103. When the user of the viewing PC 103 sends to the server 3, along with that password, a transmission request for the image corresponding to the special image file 340, the main controller 61 of the server 3 checks the password sent to it against the authentication code stored in the special image file 340 in the server HDD 64 and, if these are confirmed to match, the main controller 61 restores the original image 300 from the altered image 320 and the restoration-oriented information in the special image file 340, and transmits the image data representing the original image 300 to the viewing PC 103 (in the event of mismatch, the transmission does not take place). As a result, on the display portion (unillustrated) provided in the viewing PC 103, the original image 300 is displayed.

Instead of furnishing the password, the ID number of the viewing PC 103 may be linked with the authentication code. Specifically, put in simple terms, on the image-sensing apparatus 1 or on the user PC 2, an authentication code is set such that the authentication code in the header region 341 is identical with the ID number of the viewing PC 103, and the special image file 340 containing that authentication code is uploaded to the server 3. When the user of the viewing PC 103 sends to the server 3 a transmission request for the image corresponding to the special image file 340, the main controller 61 of the server 3 checks the ID number of the viewing PC 103 against the authentication code in the header region 341 and, if these are confirmed to match, the main controller 61 restores the original image 300 from the altered image 320 and the restoration-oriented information in the special image file 340, and transmits the image data representing the original image 300 to the viewing PC 103 (in the event of mismatch, the transmission does not take place).

Other than those described above, many modifications are possible, of which some useful will be presented below.

MODIFIED EXAMPLE 1

An authentication code may be used to restrict access to various kinds of information in the header region 341. For example, the server 3 provides various kinds of information in the header region 341 of the special image file 340 in the server HDD 64 only for a viewing PC that has furnished its authentication code to the server 3. In a similar manner, publication level information may be used to restrict access to various kinds of information in the header region 341. For example, the server 3 provides various kinds of information in the header region 341 of the special image file 340 in the server HDD 64 only for the viewing PC 101 with the first authorization.

MODIFIED EXAMPLE 2

Contents as shown in FIG. 11 written in a prescribed format may be used as publication level information. Instead, for example, the contents shown in FIG. 11 may be prescribed to be "1" in the entire image management system shown in FIG. 3. In this case, it suffices to write "1" as publication level information in the header region 341. In this case, needless to say, publication level information different from that shown in FIG. 11 is assigned a character string other than "1". Other than that, publication level information may be expressed by being written in any format prescribed within the image management system. The relationship between the different publication relationships and the different authorizations shown in FIG. 11 is merely an example, and the user can change it in many ways.

MODIFIED EXAMPLE 3

In the example described above, in response to transmission requests from viewing PCs with the first, second, and third authorizations, the original image 300, the altered image 320, and the second altered image are transmitted respectively. This is merely an example, and can be changed in many ways. For example, in response to transmission requests from viewing PCs with the first, second, and third authorizations, the original image 300, the original image 300, and the altered image 320 may be transmitted respectively; or the original image 300, the altered image 320, and the altered image 320 may be transmitted respectively. It is possible even not to transmit any image in response to a transmission request from a viewing PC with the third authorization.

MODIFIED EXAMPLE 4

In the example described above, according to publication level information, the mode of publication is classified into three levels. The number of levels here is arbitrary. According to the prescriptions of an SNS or the like, the mode of publication may be classified into four or more levels, or into as few as two levels. For security purposes, two levels can be said to suffice. Likewise, the classification of different authorizations may be into any number other than three. In a case where, as described above as Modified Example 3, in response to transmission requests from viewing PCs with the first, second, and third authorizations, the original image 300, the original image 300, and the altered image 320 are transmitted respectively, the mode of publication is, in practical terms, classified into two levels.

EXAMPLE 5

The operation with a special image file for a still image has been described heretofore. A similar operation can be applied to a moving image. Now an example dealing with a special image file for a moving image will be described as Example 5.

Figure 14:
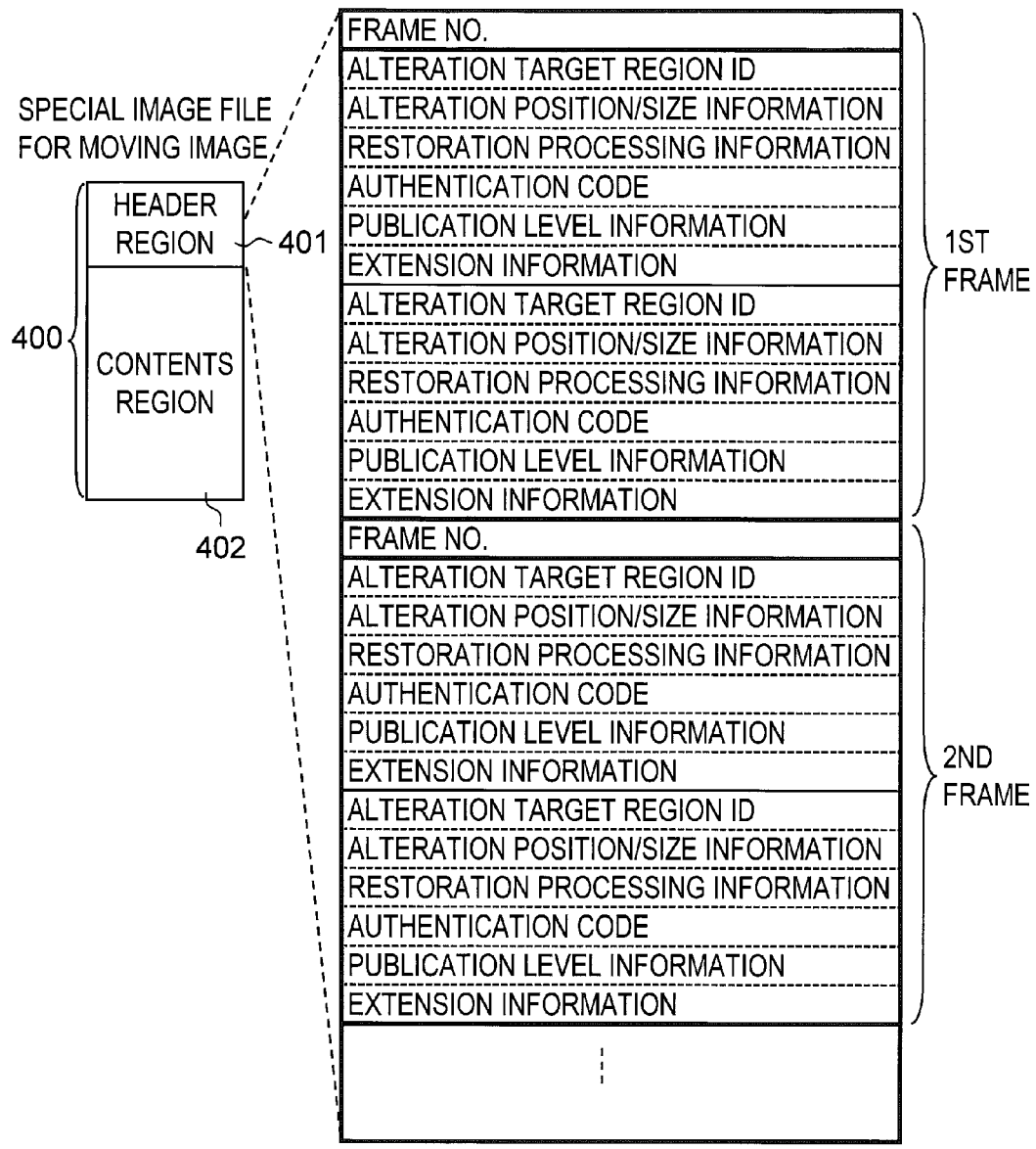
FIG. 14 is a diagram showing the data structure of a special image file for a moving image which is created and saved in the image-sensing apparatus of FIG. 1.

FIG. 14 shows the data structure of the special image file 400 created and recorded to the memory card 18 when the record button 26*a* in FIG. 1 is operated. This special image file 400 is one for a moving image, and is created within the image-sensing apparatus 1 under the control of the CPU 23.

The special image file 400 is composed of a header region 401 and a contents region 402. Naturally the head region and contents region defined within a single special image file are associated with each other. In the case of the special image file 400, the header region 401 and contents region 402 are associated with each other, and the different pieces of data stored within the special image file 400 are associated with one another.

A moving image is composed of a chronological sequence of a plurality of frame images. Every time a frame period passes, one frame image is acquired. Each frame image is a shot image, i.e. one of the shot images obtained one after another from the image-sensing portion 11. In a moving image, each frame image is taken as an original image for the alteration processor 82 in FIG. 6, and each original image is converted into an altered image.

In the contents region 402, the image data representing each altered image is stored. This image data is compressed data as a compressed video signal obtained by compressing each altered image with the compression processor 16 in FIG. 1. In the header region 401, information related to an alteration target region etc. are stored. Typically, for example, for each frame, there are created an alteration target region ID, alteration position/size information, restoration processing information, an authentication code, publication level information, and extension information, and these are stored in the header region 401. Here, in a case where there are a plurality of alteration target regions, for each of them, there are created an alteration target region ID, alteration position/size information, restoration processing information, an authentication code, publication level information, and extension information. FIG. 14 assumes a case where, within one frame image, there are two alteration target regions.

The alteration target region ID, alteration position/size information, restoration processing information, authentication code, publication level information, and extension information for each frame (frame image) are similar to those in a special image file for a still image. In the header region 401, as many sets of information similar to that in the header region for a still image are stored as there are frames. To each frame, all the description given previously of a still image is applicable.

Publication level information etc. can be set individually for each frame; alternatively, identical publication level information, for instance, can be shared among all frames. The same applies to restoration processing information and authentication codes. In a case where publication level information, restoration processing information, and an authentication code are shared among all frames, for the second and following frames, it suffices to store alteration position/size information alone in the header region 401.

In a case where the publication level information for the kth frame is changed from that for the (k−1)th frame, the publication level information for the kth frame needs to be written in the header region 401 (where k is an integer of 2 or more). In this case, if no new publication level information for the (k+1)th and following frames is written to the header region 401, the publication level information for the (k+1)th and following frames is regarded as identical with that for the kth frame. The same applies to authentication codes etc.

The user PC 2 and the server 3 in FIG. 3 comply with the special image file for a moving image as well as the special image file for a still image. That is, in the entire image management system including the image-sensing apparatus 1, the user PC 2, and the server 3 in FIG. 3, the data save format in the header region 401 and that in the entire special image file 400 are prescribed.

Like the special image file for a still image, the special image file 400 can be uploaded via the user PC 2 over the communications network 4 to the server 3. When the special image file 400 is so uploaded, the server 3 stores it, in association with the ID number of the user PC 2, in the server HDD 64.

On receiving from viewing PCs transmission requests to transmit the image corresponding to the special image file 400, the server 3 performs similar processing as in Example 4 on the altered image of each frame within the special image file 400. For example, in a case where the same publication management relationship information as in FIG. 10 of Example 4 is prescribed and the same publication level information as in FIG. 11 is set for all frames, when the viewing PC 101 sends to the server 3 a transmission request for the special image file 400, one altered image in the contents region 402 after another is restored so that a moving image composed of so restored original images is transmitted from the server 3 to the viewing PC 101. By contrast, when the viewing PC 103 sends to the server 3 a transmission request for the special image file 400, a moving image composed of a chronological sequence of one altered image in the contents region 402 after another is transmitted from the server 3 to the viewing PC 103. In a case where publication level information differs between frames, whether to permit or prohibit the restoration and transmission of original images is judged for each frame.

EXAMPLE 6

Next, Example 6 will be described. Example 6 deals with a method of protecting privacy or the like with respect to an image that is not intended to be put open to the general public over the communications network 4 or the like.

Figure 15:
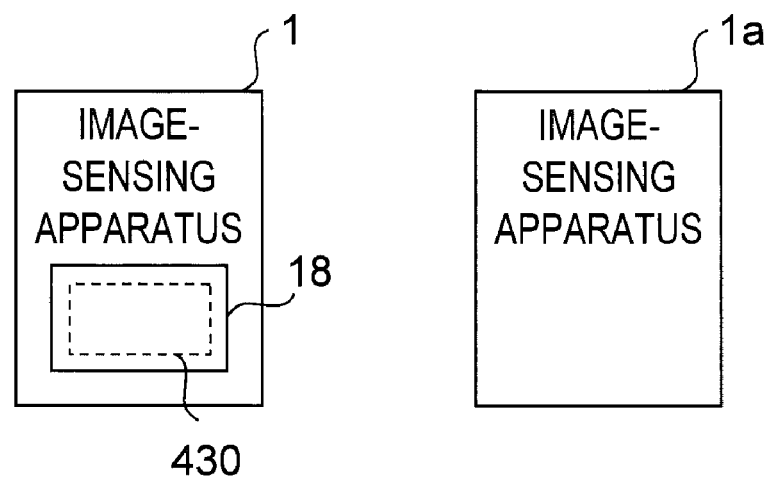
FIG. 15 is a diagram showing two image-sensing apparatuses in Example 6 of the invention.

First, a description will be given of a method of protecting privacy or the like among a plurality of image-sensing apparatuses. Suppose now that, as shown in FIG. 15, there are two image-sensing apparatuses 1 and 1*a*. The image-sensing apparatus 1 in FIG. 15 is the same as that shown in FIGS. 1 and 3. The image-sensing apparatus 1*a* is one having the same configuration as the image-sensing apparatus 1. Since the overall block diagram of the image-sensing apparatus 1*a* is the same as that shown in FIG. 1, no separate drawing will be given.

Each image-sensing apparatus, including the image-sensing apparatuses 1 and 1*a*, is assigned an individual code unique to it. This individual code is, for example, the serial number assigned to each image-sensing apparatus. For example, before shipment out of the factory, such an individual code is saved in an nonvolatile memory provided in each image-sensing apparatus (1 or 1*a*). Suppose now that the individual code assigned to the image-sensing apparatus 1 is called the "first individual code", and that the individual code assigned to the image-sensing apparatus 1*a* is called the "second individual code". As will be understood from the foregoing, the first and second individual codes differ from each other.

In this Example, it is assumed that each image-sensing apparatus (1, 1*a*) writes the individual code assigned to it as an authentication code to the header region of special image files. Moreover, in this Example, as distinct from the other examples described previously, it is assumed that the authentication code in the header region of special image files cannot be changed by a user. Furthermore, in this Example, it is assumed that each image-sensing apparatus (1, 1*a*) has installed on it a viewing software program for viewing special image files so that, on that viewing software program, it can read out image data in special image files (it is assumed that, without the viewing software program, it cannot read out image data in special image files). The viewing software program runs on the CPU 23 in FIG. 1

Consider now a case where the image-sensing apparatus 1 has just shot a still or moving image and a special image file 430 for a still or moving image has just been saved in the memory card 18 in the image-sensing apparatus 1. The data structure of the special image file 430 is similar to that of the special image file 340 in FIG. 8 or of the special image file 400 in FIG. 14. In the header region of the special image file 430, the first individual code assigned to the image-sensing apparatus 1 is written as an authentication code.

The viewing software program checks the authentication code written in the header region of the special image file 430 against the individual code of the image-sensing apparatus on which the viewing software program is installed, and only when the two match, the viewing software program restores the original image from the altered image in the special image file 430 and displays the original image on the display portion of the image-sensing apparatus on which the viewing software program is installed. The restoration here is executed by a restoration processor (unillustrated) implemented in the video signal processor 13 in FIG. 1. A checker that checks the authentication code and the individual code against each other, and a determiner that, based on the result of the check, determines whether to permit or prohibit the restoration and display of the original image, are realized by the CPU 23.

Specifically, the image-sensing apparatus 1 operates as follows. When the user of the image-sensing apparatus 1 wants to view the original image corresponding to the special image file 430, he makes an operation requesting its viewing by use of the operation keys 26*c*. In response to this operation, the viewing software program (i.e. the CPU 23 of the image-sensing apparatus 1) reads out from the memory card 18 the authentication code written in the header region of the special image file 430, reads out from the above-mentioned nonvolatile memory or the like the individual code assigned to the image-sensing apparatus 1, and checks the authentication code and the individual code thus read out against each other. In the case under discussion, the two match, and thus the viewing software program (i.e. the CPU 23 of the image-sensing apparatus 1) permits the restoration and display of the original image. Accordingly, on the image-sensing apparatus 1, the original image is restored from the altered image in the special image file 430, and is displayed on the display screen of the display portion 27 of the image-sensing apparatus 1.

By contrast, when the memory card 18 having the special image file 430 stored in it is attached to the image-sensing apparatus 1*a*, and the user of the image-sensing apparatus 1*a* makes an attempt to view the original image corresponding to the special image file 430, the image-sensing apparatus 1*a* operates as follows. On the image-sensing apparatus 1*a*, when an operation is made to request the viewing of the original image, the viewing software program (i.e. the CPU 23 of the image-sensing apparatus 1*a*) reads out from the memory card 18 the authentication code written in the header region of the special image file 430, reads out from the above-mentioned nonvolatile memory or the like the individual code assigned to the image-sensing apparatus 1*a*, and checks the authentication code and the individual code thus read out against each other. In the case under discussion, the two do not match, and thus the viewing software program (i.e. the CPU 23 of the image-sensing apparatus 1*a*) prohibits the restoration and display of the original image. In this case, for example, the altered image in the special image file 430 is displayed on the display screen of the display portion 27 of the image-sensing apparatus 1*a*; or instead a message indicating that the image cannot be displayed is displayed on the display screen of the display portion 27 of the image-sensing apparatus 1*a*.

Preferably, of the image-sensing apparatuses 1 and 1*a*, only the image-sensing apparatus 1 is made capable of being disabled from performing the above-described processing related to the permission/prohibition of the restoration of the original image. This disabling is effected on the viewing software program on the condition that the authentication code and the individual code match (accordingly, it cannot be executed on the image-sensing apparatus 1*a*). After an operation requesting the disabling is performed on the image-sensing apparatus 1, then the restoration and display of the original image corresponding to the special image file 430 can be performed also on the image-sensing apparatus 1*a*.

Figure 16:
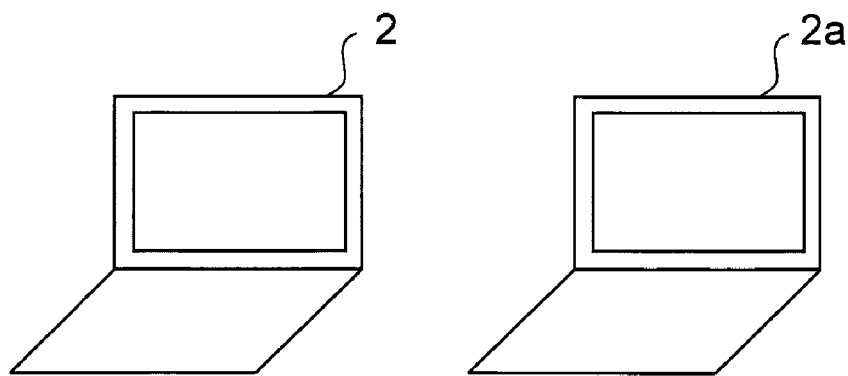
FIG. 16 is a diagram showing two PCs (personal computers) in the Example 6 of the invention.

Next, a description will be given of a method of protecting privacy or the like on a PC, taking up the above-described special image file 430 as an example. Suppose now that, as shown in FIG. 16, in addition to the user PC 2, there is a personal computer 2*a* (hereinafter "PC 2*a*") different from the user PC 2. The PC 2*a* has the same configuration as the user PC 2. Since the internal block diagram of the PC 2*a* is the same as that shown in FIG. 4, no separate drawing will be given. The special image file 430 is provided for the user PC 2 and the PC 2*a*.

In this Example, it is assumed that the user PC 2 and the PC 2*a* have installed on them a dedicated software program for special image files, and that any playback appliance (image display apparatus)—including the user PC 2 and the PC 2*a*—that can access special image files can read out and edit the data of special image files only on the dedicated software program. The dedicated software program is stored in the memory 48 in FIG. 4, which is, for example, a hard disk, and the dedicated software program runs on the main controller 41.

The dedicated software program allows a PC registration code to be registered in it. The registration is performed when the dedicated software program is installed on a playback appliance (e.g. the user PC 2 and the PC 2*a*). When installing the dedicated software program on the user PC 2, the user of the image-sensing apparatus 1 and the user PC 2 feeds the first individual code assigned to the image-sensing apparatus 1 into the user PC 2 so that the first individual code is registered as a PC registration code on the dedicated software program on the user PC 2. On the other hand, when installing the dedicated software program on the PC 2a, the user of the image-sensing apparatus 1a and the PC 2a feeds the second individual code assigned to the image-sensing apparatus 1a into the PC 2a so that the second individual code is registered as a PC registration code on the dedicated software program on the PC 2a. The first individual code is unknown to the user of the image-sensing apparatus 1a and the PC 2a.

The dedicated software program checks the authentication code (in the example under discussion, the first individual code) written in the header region of the special image file 430 and the PC registration code registered in the dedicated software program against each other and, only when the two match, the dedicated software program restores the original image from the altered image in the special image file 430 and displays the original image on the display portion of the playback appliance on which the dedicated software program is installed. The restoration here is executed, for example, by the image processor 42 (restoration processor) in FIG. 4. A checker that checks the authentication code and the PC registration code against each other, and a determiner that, based on the result of the check, determines whether to permit or prohibit the restoration and display of the original image, are realized by the main controller 41.

Specifically, the user PC 2 operates as follows. When the user of the user PC 2 wants to view the original image corresponding to the special image file 430, he makes an operation requesting its viewing by use of the PC operation keys 47. In response to this operation, the dedicated software program (i.e. the main controller 41 of the user PC 2) checks the authentication code written in the header region of the special image file 430 and the PC registration code registered in the dedicated software program on the user PC 2 against each other. In the example under discussion, the two match, and thus the dedicated software program (i.e. the main controller 41 of the user PC 2) permits the restoration and display of the original image. Accordingly, on the user PC 2, the original image is restored from the altered image in the special image file 430, and is displayed on the display screen of the display portion 45 of the user PC 2. On the user PC 2, the editing of the original image is also permitted.

By contrast, when the user of the PC 2a makes an attempt to view the original image corresponding to the special image file 430, the PC 2a operates as follows. The user of the PC 2a makes an operation requesting its viewing by use of the PC operation keys 47 of the PC 2a. In response to this operation, the dedicated software program (i.e. the main controller 41 of the PC 2a) checks the authentication code written in the header region of the special image file 430 and the PC registration code registered in the dedicated software program on the PC 2a against each other. In the case under discussion, the two do not match, and thus the dedicated software program (i.e. the main controller 41 of the PC 2a) prohibits the restoration and display of the original image. In this case, for example, the altered image in the special image file 430 is displayed on the display screen of the display portion 45 of the PC 2a; or, instead, a message indicating that the image cannot be displayed is displayed on the display screen of the display portion 45 of the PC 2a.

Preferably, of the user PCs 2 and 2a, only the user PC 2 is made capable of being disabled from performing the above-described processing related to the permission/prohibition of the restoration of the original image. This disabling is effected on the special software program on the condition that the authentication code and the PC registration code match (accordingly, it cannot be executed on the PC 2a). After an operation requesting the disabling is performed on the user PC 2, then the restoration and display of the original image corresponding to the special image file 430 can be performed also on the PC 2a.

Through the processing described above, the original image is not displayed other than on the image-sensing apparatus 1 or the user PC 2. Thus, even if the memory card 18 is lost or stolen, or if the special image file 430 leaks out over the Internet by a computer virus, abuse of file exchange software, etc., privacy or the like is protected

EXAMPLE 7

Any special image file for a still or moving image which is generated in any of the Examples described above can be copied (duplicated) to a recording medium other than the memory card 18. A scheme for protecting privacy or the like may be introduced in such copying. This will now be described as Example 7, taking up as an example a special image file for a still image. In this Example, the copying of a special image file is permitted only on a particular copying software program. The copying software program is installed, for example, on the user PC 2, and runs on the user PC 2.

FIG. 17 shows the data structure of a special image file 500 in this Example. The special image file 500 is composed of a header region 501, which is the header region 341 in FIG. 8 having authorization level information added to it, and a contents region 502, which is the same as the contents region 342 in FIG. 8. The authorization level information may be regarded as being contained in the authorization management information in the header region 501.

Authorization level information indicates one of a plurality of authorization levels into which different levels of authorization are classified. It is here assumed that authorization level information takes one of the values "1", "2", and "3", meaning that authorization levels are classified into three levels. Needless to say, authorization levels may be classified into any number of levels other than three. It is assumed that "1" in authorization level information indicates the highest authorization level and, as the value of authorization level information increases, the authorization level lowers.

Authorization level information is initially "1". That is, when the special image file 500 is created and saved on the image-sensing apparatus 1, "1" is written as authorization level information. It is assumed that the user cannot change this authorization level information.

When the special image file 500 is copied on the copying software program, only the authorization level information is changed from that of the special image file of the copying source. Specifically, as compared with the value of the authorization level information in the special image file of the copying source, the value of the authorization level information in the special image file of the copying destination is made greater by one or more. For example, when the authorization level information in the special image file of the copying source is "1", the authorization level information in the special image file of the copying destination is set at "2"; when the authorization level information in the special image file of the copying source is "2", the authorization level information in the special image file of the copying destination is set at "3". It is however assumed that, in a case where the user who are going to copy performs the copying after feeding the authentication code stored in the header region 501 into the appliance (e.g. the user PC 2) on which the copying software program is installed, the authorization level information is not changed.

Suppose now that the original image corresponding to the contents of the special image file 500 is the original image 300 of FIG. 7A. In this Example, any playback appliance (image display apparatus)—including the image-sensing apparatus 1 and the user PC 2—that can access the special image file 500 displays images according to authorization level information. That is, when an image contained in a special image file is displayed, the playback appliance consults the authorization level information in the special image file 500 fed to it. If the authorization level information is "1", based on the restoration-oriented information in the special image file 500, the playback appliance restores the original image 300 form the altered image in the special image file 500 and displays the original image 300. If the authorization level information is "2", the playback appliance generates the second altered image shown in FIG. 12B, and displays the second altered image. The second altered image is generated in a manner similar to that described in connection with Example 4. If the authorization level information is "3", the playback appliance displays the altered image shown in FIG. 12C (that is, it displays the altered image in the special image file 500 as it is).

As described above, by changing authorization level information (lowering the authorization level related to playback) every time copying is performed, it is possible to suppress the possibility of an image with an identifiable face being distributed among the general public, and it is thereby possible to protect privacy or the like. The above-described specific manner of changing authorization level information is merely an example; authorization level information may be changed in any manner other than in the example described above.

EXAMPLE 8

Example 8 will be described below. In Example 8, the face detector 81 in FIG. 6 is so configured that it can not simply detect a face region from a shot image (original image) but can also check whether or not the detected face region fulfills a specific face condition. Prior to the acquisition of an image to be recorded to the memory card 18 by a special recording method, the user can set a specific face condition on the image-sensing apparatus 1. In Example 8, an alteration target region is set based on, in addition to the result of the face detection by the face detector 81, whether or not the specific face condition is fulfilled. Except for the operation for setting an alteration target region, the configuration and operation of the image-sensing apparatus 1 of Example 8 are as described in connection with Example 1.

For example, in a case where the face included in the detected face region is that of a registered person previously set on the image-sensing apparatus 1, the specific face condition is judged to be fulfilled. To use such a specific face condition, the user previously stores the image of the face of the person he wants to register as a registered face image on the image-sensing apparatus 1. Thereafter, when a face region is extracted from an original image, based on the image data of the image of the extracted face region and the image data of the registered face image, the face detector 81 evaluates the similarity between the two images, and, if the evaluated similarly is higher than a reference degree of similarity, the face detector 81 judges the face in the extracted face region to be that of the registered person; if not, the face detector 81 judges the face in the extracted face region not to be that of the registered person. When the face in the extracted face region is judged to be that of the registered person, the face region including the face of that registered person is judged to fulfill the specific face condition (hereinafter also referred to as the "first specific face condition").

For another example, the face detector 81 is so configured that it can estimate the sex of the person whose face is included in a detected face region. On the other hand, by operating the operated portion 26 in a predetermined manner or otherwise, the user previously sets either "male" or "female" as a specific sex that affects the judgment of whether a specific face condition is fulfilled. When a face region is extracted from an original image, based on the image data of the extracted face region, the face detector 81 estimates whether the face included in the face region is that of a male or female person, and, if the estimated sex matches the specific sex, the face detector 81 judges the extracted face region (i.e. the face region including the face of the person of the specific sex) to fulfill the specific face condition (hereinafter also referred to as the "second specific face condition").

For another example, the face detector 81 is so configured that it can estimate the race of the person whose face is included in a detected face region. By operating the operated portion 26 in a predetermined manner or otherwise, the user previously sets a specific race that affects the judgment of whether or not a specific face condition is fulfilled. The specific race is one of a plurality of races including white, black, and Asian. When a face region is extracted from an original image, based on the image data of the extracted face region, the face detector 81 estimates the race of the person whose face is included in the face region, and, if the estimated race matches the specific race, the face detector 81 judges the extracted face region (i.e. the face region including the face of the person of the specific race) to fulfill the specific face condition (hereinafter also referred to as the "third specific face condition").

For another example, the face detector 81 is so configured that it can estimate the age group of the person whose face is included in a detected face region. By operating the operated portion 26 in a predetermined manner or otherwise, the user previously sets a specific age group that affects the judgment of whether or not a specific face condition is fulfilled. Different ages of humans (e.g. from age 0 to age 100) are divided into a plurality of age groups, and one of these is set as a specific age group. For example, ages 11 or less, ages from 12 to 19, ages 20 to 39, ages 40 to 59, and ages 60 and more are classified into a first, a second, a third, a fourth, and a fifth age group, so that these first to fifth age groups form the above-mentioned plurality of age groups. When a face region is extracted from an original image, based on the image data of the extracted face region, the face detector 81 estimates the age group of the person whose face is included in the face region, and, if the estimated age group matches the specific age group, the face detector 81 judges the extracted face region (i.e. the face region including the face of the person of the specific age group) to fulfill the specific face condition (hereinafter also referred to as the "fourth specific face condition").

Any method, including those well-known, may be adopted to estimate from the image data of a face region the sex, race, or age group of the person corresponding to the face region (e.g. the method disclosed in JP-A-2004-246456, JP-A-2005-266981, or JP-A-2003-242486).

The alteration processor 82 shown in FIG. 6 sets an alteration target region based on the face detection result that identifies the position and size of a face region extracted from an original image by the face detector 81 and based on whether or not the above-mentioned specific face condition is fulfilled. For the sake of concreteness of description, consider now a case where the original image 300 shown in FIG. 7A is acquired.

Figure 18A:
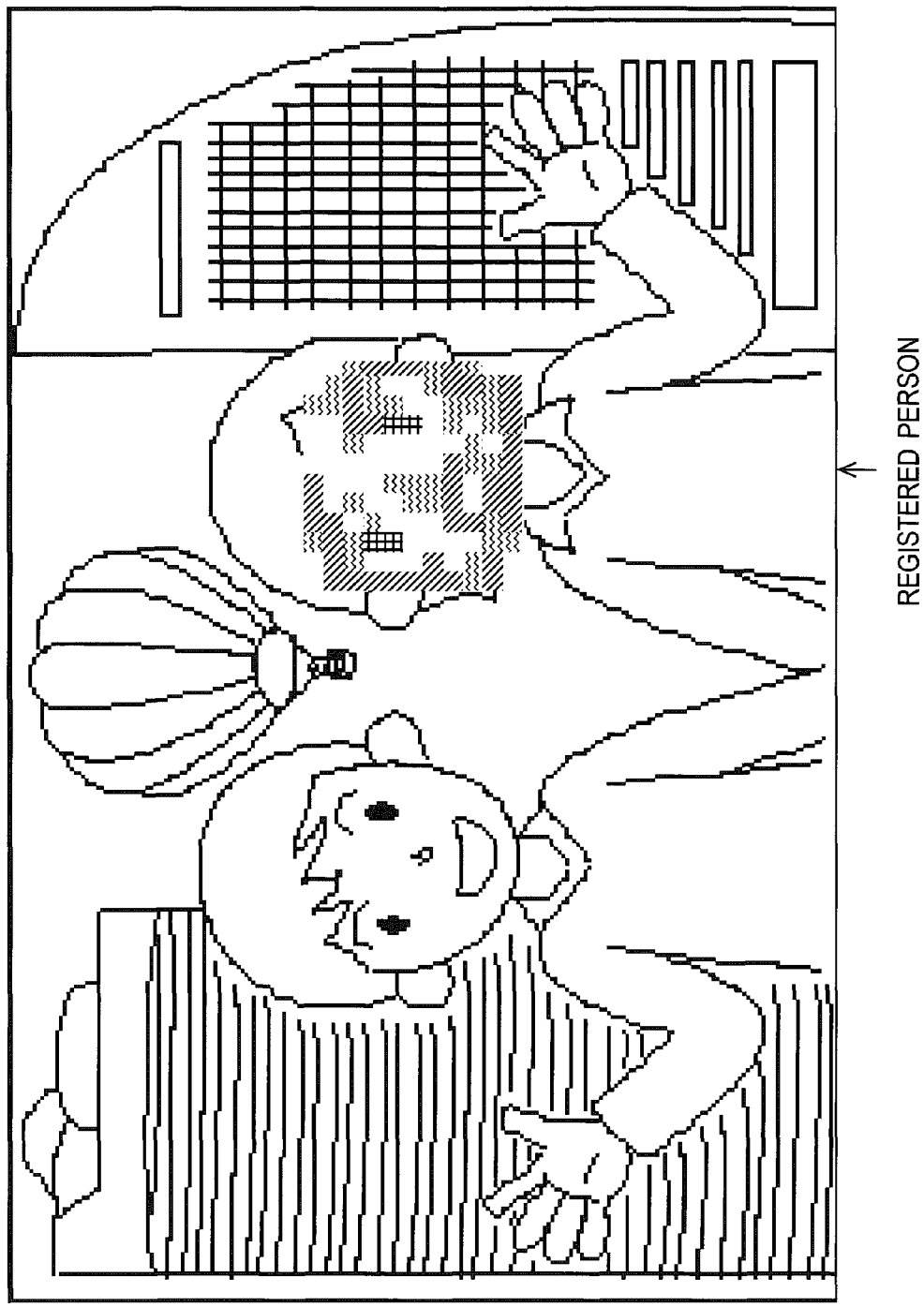

In this case, if the person 302 alone has been set as a registered person on the image-sensing apparatus 1, the alteration processor 82 sets the face region 312 as an alteration target region but excludes the face region 311 from the alteration target region; the alteration processor 82 then applies alteration as described in connection with Example 1 etc. to the alteration target region to produce an altered image. Thus, an altered image as shown in FIG. 18A is obtained.

Or, if "female" is set as a specific sex on the image-sensing apparatus 1, the alteration processor 82 sets the face region 312 as an alteration target region but excludes the face region 311 from the alteration target region; the alteration processor 82 then applies alteration as described in connection with Example 1 etc. to the alteration target region to produce an altered image. Thus, an altered image as shown in FIG. 18B is obtained.

Figure 18C:
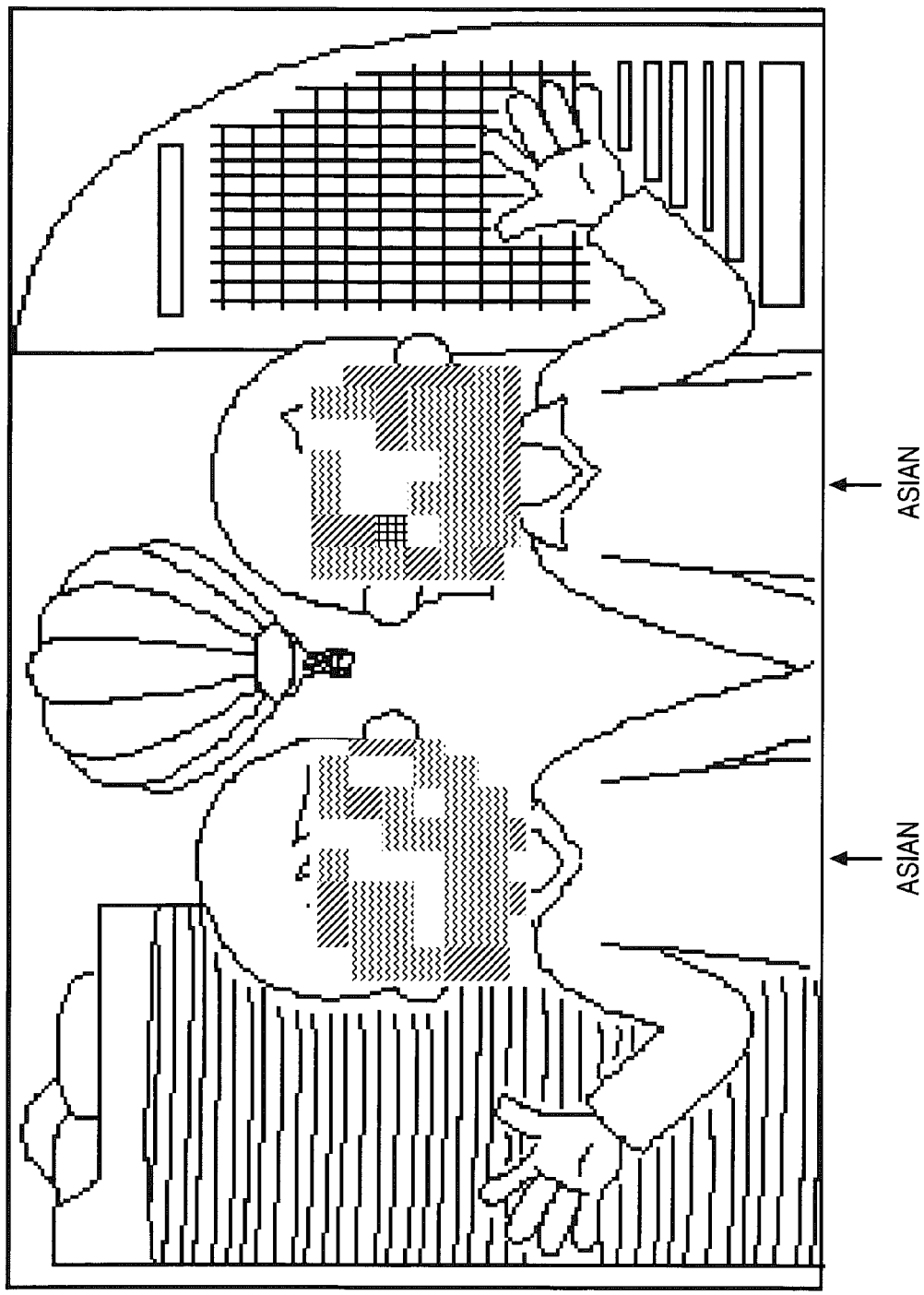

Or, if "Asian" is set as a specific race on the image-sensing apparatus 1, the alteration processor 82 sets the face regions 311 and 312 both as alteration target regions, and applies alteration as described in connection with Example 1 etc. to the alteration target regions to produce an altered image (it is here assumed that the persons 301 and 302 are both Asian). Thus, an altered image as shown in FIG. 18C is obtained.

Figure 18D:
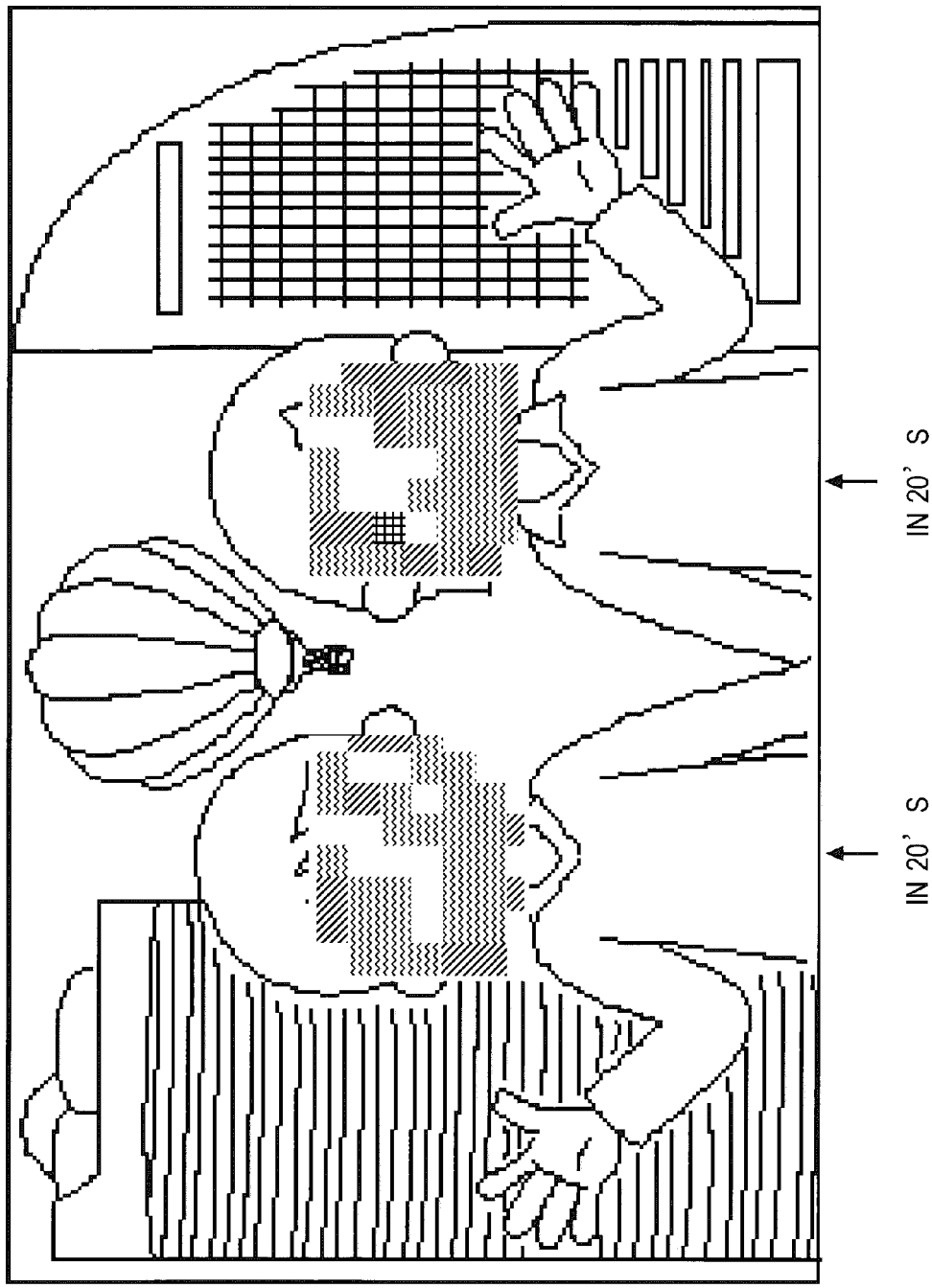

Or, if the above-mentioned third age group is set as a specific age group on the image-sensing apparatus 1, the alteration processor 82 sets the face regions 311 and 312 both as alteration target regions, and applies alteration as described in connection with Example 1 etc. to the alteration target regions to produce an altered image (it is here assumed that the persons 301 and 302 are both in their twenties). Thus, an altered image as shown in FIG. 18D is obtained.

It is also possible to set as an alteration target region only a face region that fulfills two or more of the first to fourth specific face conditions mentioned above.

By use of specific face conditions as described above, it is possible to achieve appropriate protection of privacy only for people intended by a user.

EXAMPLE 9

Example 9 will be described below. Like Example 5 described previously, which deals with an image processing method for a moving image, Example 9 also deals with an image processing method for a moving image.

As described in connection with Example 5, a moving image is composed of a chronological sequence of a plurality of frame images. Every time a frame period passes, one frame image is acquired. Each frame image is a shot image, i.e. one of the shot images obtained one after another from the image-sensing portion 11. In a moving image, each frame image is taken as an original image for the alteration processor 82, and each original image is converted into an altered image. A special image file for a moving image is created in a manner similar to that described in connection with Example 5. Described below as a feature unique to Example 9 will be a method of setting an alteration target region which involves the tracking of a specific subject.

Figure 19:
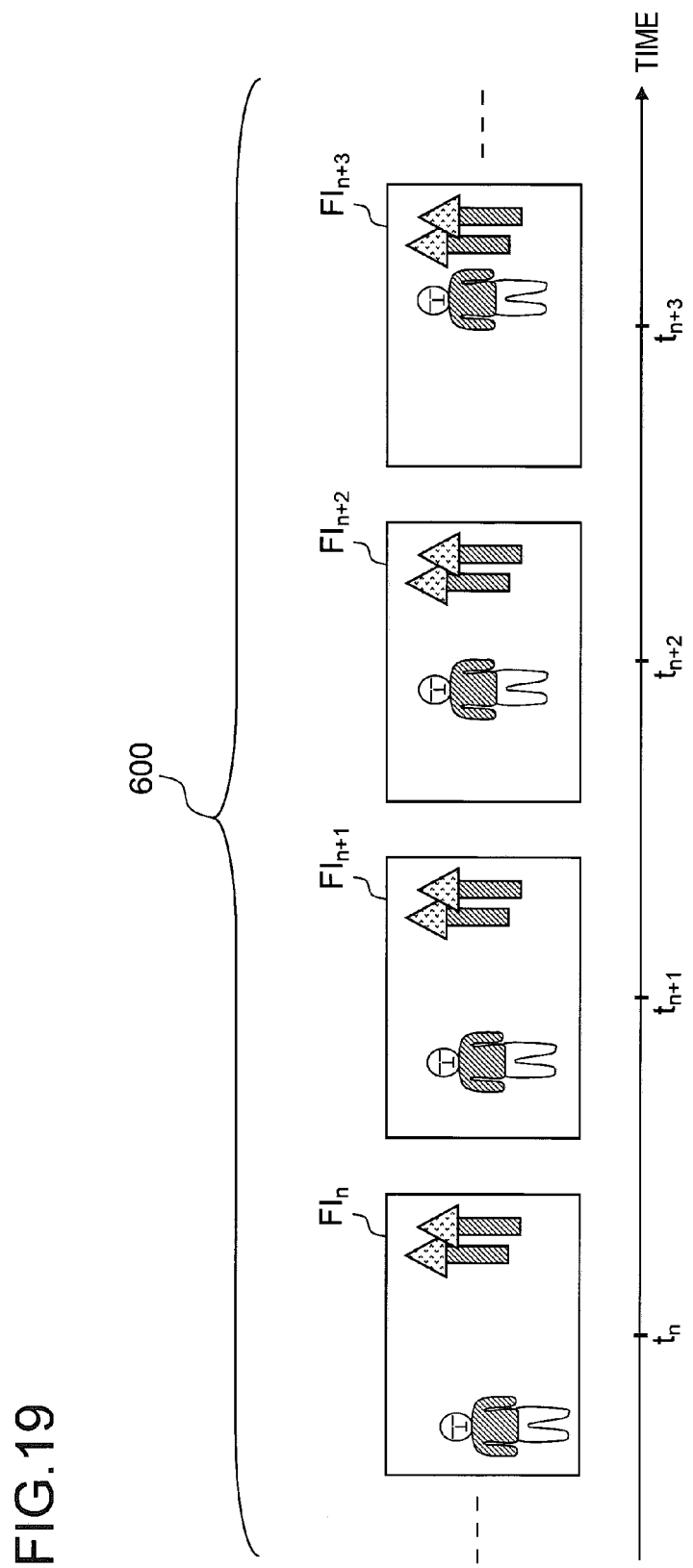
FIG. 19 is a diagram showing a moving image obtained from the image-sensing portion in FIG. 1 in Example 9 of the invention.

Consider now a case where, by shooting using the image-sensing portion 11 in FIG. 1, a moving image 600 is acquired. FIG. 19 shows a plurality of frame images as a plurality of original images composing the moving image 600. The plurality of frame images composing the moving image 600 include a frame image $FI_n$ shot at time $t_n$, a frame image $FI_{n+1}$ shot at time $t_{n+1}$, a frame image $FI_{n+2}$ shot at time $t_{n+2}$, a frame image $FI_{n+3}$ shot at time $t_{n+3}$, ... (where n is an integer). It is assumed that one frame period after time $t_i$ comes time $t_{i+1}$ (where i is an integer).

Figure 20:
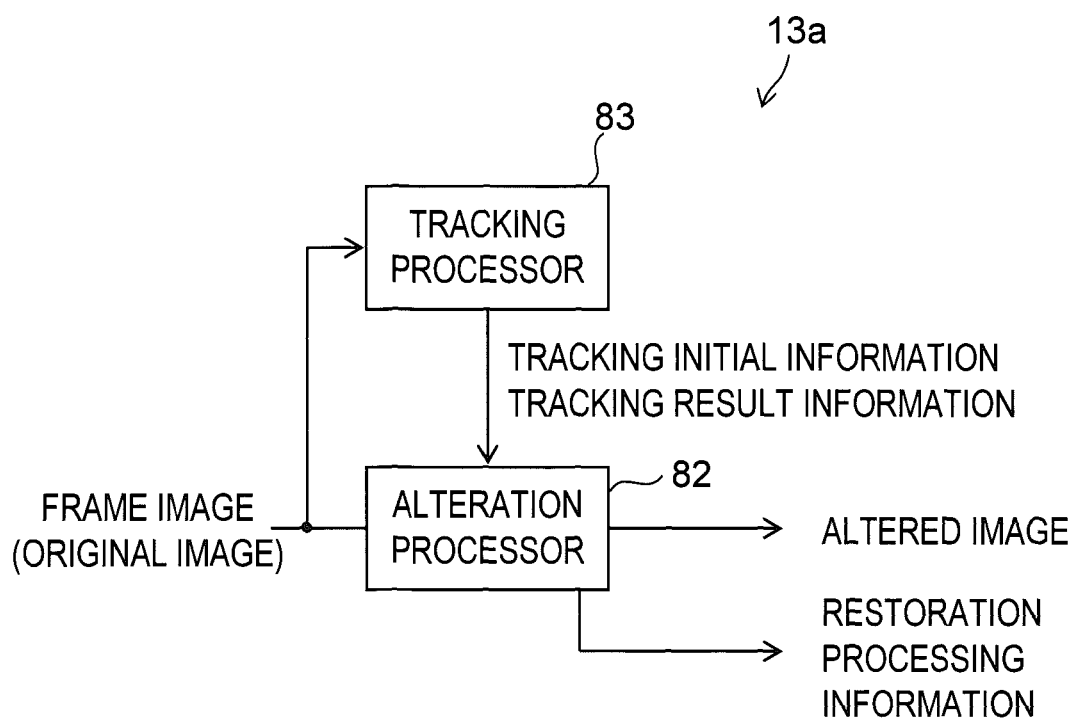
FIG. 20 is a partial internal block diagram of the video signal processor in Example 9 of the invention.

FIG. 20 is a partial internal block diagram of the video signal processor 13a in Example 9. The video signal processor 13a is used as the video signal processor 13 in FIG. 1. The video signal processor 13a includes a tracking processor 83 and an alteration processor 82. The alteration processor 82 has the same functions as that shown in FIG. 6. The tracking processor 83 is equipped with the function of tracking a specific subject included in the moving image 600 within the moving image 600.

Based on the image data of the moving image 600, the tracking processor 83 detects the position of a specific subject in one frame image after another thereby to track the position of the specific subject within the moving image 600. A specific subject to be tracked will, in the following description, be called a "tracking target".

The tracking processor 83 takes one of the plurality of frame images composing the moving image 600 as a reference frame image, and, based on the image data of the reference frame image, sets a tracking target and detects the position and size of the tracking target in the reference frame image. Thereafter, the tracking processor 83 takes another—other than the reference frame image—of the plurality of frame images composing the moving image 600 as a tracking target frame image, and, based on the image data of the tracking target frame image, detects the position and size of the tracking target in the tracking target frame image.

For example, the tracking processor 83 performs tracking based on the color information that a tracking target possesses. As a method of tracking based on color information, it is possible to adopt one of those disclosed in JP-H5-284411, JP-A-2000-48211, JP-A-2001-169169, etc. Instead of tracking based on color information, it is possible to perform tracking based on any other information (tracking by any other method). For example, the tracking processor 83 may perform tracking using image matching, tracking using optical flows, tracking using moving object detection based on a background subtraction method, or tracking using moving object detection based on a frame subtraction method.

For the sake of concreteness of description, the following description assumes a case where the tracking processor 83 performs tracking based on color information. It is also assumed that the tracking target is a person. In a case where the tracking target is a person, the tracking processor 83 is equipped not only with the tracking function but also the functions comparable with those with which the face detector 81 in FIG. 6 is equipped. The tracking target may be other than a person. For example, the tracking target may be a vehicle such as an automobile, or a robot that moves around.

Of the plurality of frame images composing the moving image 600, one which includes a tracking target is set as the reference frame image. For example, of the plurality of frame images composing the moving image 600, the one obtained earliest among those including the tracking target is set as the reference frame image. For the sake of simplicity of description, suppose now that, of the plurality of frame images composing the moving image 600, only four $FI_n$ to $FI_{n+3}$ include the tracking target (only the frame images $FI_n$ to $FI_{n+3}$ contain the image data of the tracking target). Then the frame image $FI_n$ is set as the reference frame image. The reference frame image may instead be set through manual operation by the user.

Figure 21:
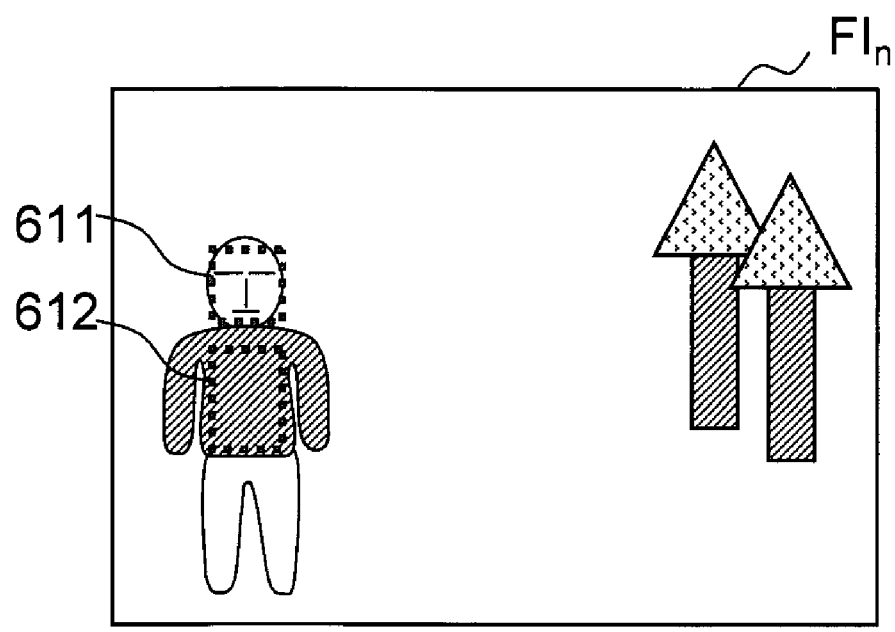
FIG. 21 is a diagram showing how a face region and a body region are extracted from the reference frame image within the moving image of FIG. 19.

Based on the image data of the frame image $FI_n$ as the reference frame image, the tracking processor 83 sets the tracking target and the tracking color. The method of setting the tracking target and the tracking color will now be described with reference to FIG. 21. In FIG. 21, the broken-line rectangular region 611 is the face region extracted from the frame image $FI_n$ as the reference frame image by the face detection by the tracking processor 83. The tracking processor 83 sets as the tracking target the person whose face is included in the face region 611. After the extraction of the face region 611, the tracking processor 83 detects a body region 612, which is the region containing the body of the person corresponding to the face region 611. The body region 612 is a rectangular region located below (in the direction of the mouth as viewed from the middle of the forehead) the face region 611. In the reference frame image, the position and size of the body region 612 are determined depending on the position and size of the face region 611.

Thereafter, based on the image data of the image inside the body region 612, the tracking processor 83 identifies the color inside the body region 612, and sets the identified color as the tracking color. For example, the tracking processor 83 generates a color histogram of the image inside the body region 612 based on the color signals (e.g. RGB signals) of the pixels forming the image inside the body region 612. Then, based on the color histogram, the alteration processor 83 finds the dominant color or the most frequently occurring color in the image inside the body region 612, and sets the found color as the tracking color. The dominant color in an image is the color that occupies the largest part of the image region of the image, and the most frequently occurring color in an image is the color whose frequency of occurrence in the color histogram of the image is highest (the dominant color may or may not be identical with the most frequently occurring color). Alternatively, the tracking processor 83 averages the color signals (e.g. RGB signals) of the pixels forming the image inside the body region 612 thereby to find the average color of the image inside the body region 612, and sets the average color as the tracking color.

The tracking target and the tracking color may be set through manual operation on the operated portion 26. For example, by operating the operated portion 26, the user may specify the position, in the frame image, of the person to be taken as the tracking target thereby to set the tracking target; by operating the operated portion 26, the user may set the tracking color.

After the tracking target and the tracking color are set with the frame image $FI_n$ taken as the reference frame image, the tracking processor 83 performs tracking on each tracking target frame image obtained after the frame image $FI_n$, and thereby detects the position and size of the tracking target in those tracking target frame images. More specifically, for example, within the tracking target frame image of interest, a tracking frame about the same size as the body region of the tracking target is set, and the similarity between the color of the image inside the tracking frame and the tracking color is evaluated repeatedly while the position of the tracking frame is changed within a search range so that the body region of the tracking target is judged to be located at the position of the tracking frame in which the highest degree of similarly is obtained. The search range for the current tracking target frame image is set relative to the position of the tracking target in the previous tracking target frame image. Usually the search range is a rectangular region with its center at the position of the tracking target in the previous tracking target frame image, and the size of the search range (image size) is smaller than that of the entire image region of the frame image.

The tracking processor 83 performs tracking on the tracking target frame images $FI_{n+1}, FI_{n+2}, FI_{n+3}, \ldots$ sequentially in the direction of the passage of time, i.e. toward the future, and thereby detects the position of the tracking target in each tracking target frame image. The size of the tracking target in a tracking target frame image can be detected by any method including those well-known (e.g. the method disclose in JP-A-2004-94680, or JP-A-H9-189934). Depending on the size of the detected tracking target, the size of the tracking frame is variably set.

Tracking result information representing the position and size of the tracking target in each tracking target frame image as detected by the tracking processor 83 is transmitted to the alteration processor 82. Also, tracking initial information representing the position and size of the tracking target in the reference frame image is transmitted from the tracking processor 83 to the alteration processor 82.

Based on the tracking initial information, the alteration processor 82 extracts from the entire image region of the reference frame image an image region in which the whole or part of the tracking target appears (a region where the image data representing the tracking target exists), and sets the extracted image region as an alteration target region in the reference frame image. For example, an image region including the face region 611 in FIG. 21, or an image region including the face region 611 and the body region 612, or an image region in which the entire image of the tracking target appears, is set as an alteration target region in the reference frame image.

Moreover, based on the tracking result information, for each tracking target frame image, the alteration processor 82 extracts from the entire image region of the tracking target frame image an image region in which the whole or part of the tracking target appears (a region where the image data representing the tracking target exists), and sets the extracted image region as an alteration target region in the tracking target frame image. For example, an image region that is located in the tracking target frame image and that includes a face region of the tracking target, an image region that is located in the tracking target frame image and that includes a face region and a body region of the tracking target, or an image region that is located in the tracking target frame image and in which the entire image of the tracking target appears, is set as an alteration target region in the tracking target frame image.

For each frame image, the alteration processor 82 applies alteration as described in connection with Example 1 etc. to the alteration target region in the frame image. Thus a chronological sequence of a plurality of altered images is generated. The operation performed after the generation of these altered images, including the operation for generating a special image file for a moving image, is similar to that described in connection with Example 5.

Figure 22:
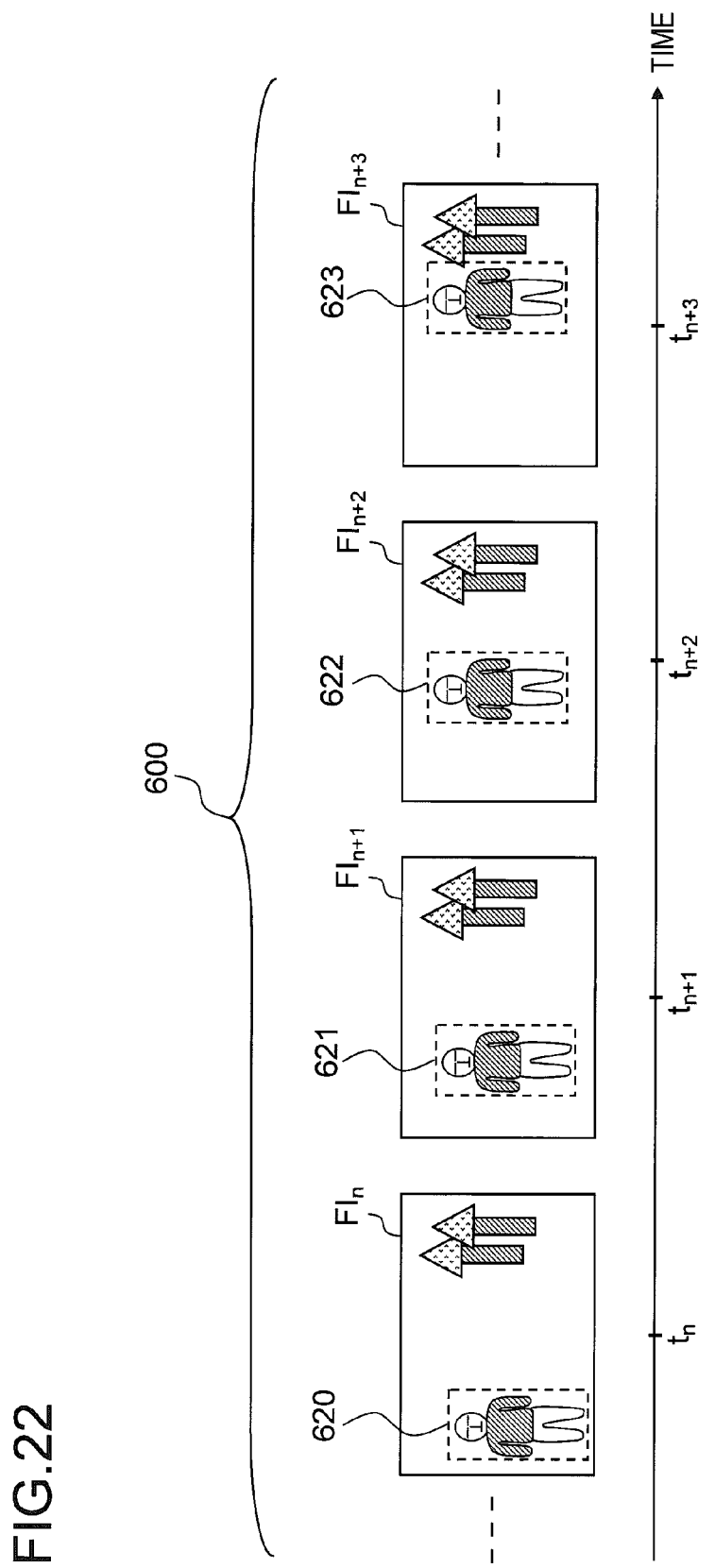
FIG. 22 is a diagram showing the alteration target region set in each of the frame images composing the moving image of FIG. 19.

FIG. 22 shows the alteration target region in each frame image in a case where an image region in which the entire image of the tracking target appears is set as an alteration target region. In FIG. 22, the broken-line rectangular regions 620-623 are the alteration target regions in the frame images $FI_n$ to $FI_{n+3}$ respectively. The exterior shape of the alteration target regions may be other than rectangular.

Although, in the example described above, tracking is performed sequentially in the direction of the passage of time, i.e. toward the future, tracking may instead be performed sequentially in the direction opposite to the passage of time, i.e. toward the past. That is, for example, in a case where, through manual operation by the user or through automatic setting by the tracking processor 83, of the plurality of frame images composing the moving image 600, the frame image $FI_{n+3}$ is set as the reference frame image, tracking may be performed on the frame images $FI_{n+2}$, $FI_{n+1}$, $FI_n$, ... in this order.

The tracking processor 83 may be additionally equipped with the function of checking whether or not a face region detected from the reference frame image fulfills a specific face condition described in connection with Example 8. Then a face region fulfilling a specific face condition is extracted from the reference frame image so that the person whose face is included in the extracted face region may be set as a tracking target. In this case, a registered person, a person of a specific sex, a person of a specific race, or a person of a specific age group is set as a tracking target. It is also possible to set as a tracking target only a person corresponding to a face region that fulfills two or more of the first to fourth specific face conditions mentioned above.

With the image-sensing apparatus 1 configured as in this Example, throughout a moving image, the image of the tracking target set in the reference frame image is automatically altered. It is thus possible to protect the privacy of a tracking target throughout a moving image without imposing hardly any burden on the user.

Modifications and Variations

The specific values given in the description above are merely examples, which, needless to say, may be modified to any other values. In connection with the Examples described above, modified examples or supplementary explanations applicable to them will be given below in Notes 1 and 2. Unless inconsistent, any part of the contents of these notes may be combined with any other.

Note 1: The image-sensing apparatus 1 of FIG. 1 can be realized in hardware, or in a combination of hardware and software. In particular, the functions of the individual blocks shown in FIG. 6 can be realized in hardware, software, or in a combination of hardware and software.

The user PC 2 in FIG. 4 and the server 3 in FIG. 5 can also be realized in hardware, or in a combination of hardware and software. In particular the functions of the main controller 41 in FIG. 4 and of the main controller 61 in FIG. 5 can be realized in hardware, software, or in a combination of hardware and software. A block diagram that shows a block realized in software thus serves as a functional block diagram of that block.

Note 2: For example, the following interpretations are possible. The CPU 23 in FIG. 1 is equipped to function as a recording controller for recording special image files to the memory card 18. In the user PC 2 in FIG. 4, the card slot 44 can function as a file input portion for receiving special image files. Needless to say, special image files may be fed to the user PC 2 by wired or wireless communication.

What is claimed is:

1. An image-sensing apparatus comprising:
   an image-sensing portion which acquires an original image by shooting a subject;
   a specific region detector which detects from the original image a region having a specific image characteristic based on image data of the original image, wherein the region detected by the specific region detector is set as a specific region;
   an alteration processor which applies reversible alteration to an image inside the specific region in the original image to produce from the original image an altered image; and
   a recording controller which records in a recording portion an image file in which the altered image is stored in association with restoration-oriented information identifying contents of restoration that needs to be performed to restore the original image from the altered image.

2. The image-sensing apparatus according to claim 1, wherein the recording controller also stores in the image file, in association with the altered image and the restoration-oriented information, authorization management information for switching between whether to permit or prohibit restoration, for bringing into a viewable state, of the original image from the altered image according to the restoration-oriented information.

3. The image-sensing apparatus according to claim 2, wherein the authorization management information includes an authentication code, the image-sensing apparatus and another image-sensing apparatus are previously assigned different individual codes,
   wherein the image-sensing apparatus further comprises:
   a display portion;
   a restoration processor which restores the original image from the altered image based on the restoration-oriented information;
   a checker which checks the authentication code and the individual code assigned to the image-sensing apparatus against each other; and
   a determiner which determines based on a result of the checking by the checker whether or not to permit display of the original image restored by the restoration processor on the display portion, and
   the restoration processor and the display portion are controlled according to a result of the determination by the determiner.

4. An information providing apparatus receiving the image file according to claim 2 from a source apparatus and transmitting, in response to a transmission request from a terminal apparatus having a predetermined relationship with the source apparatus and having a display portion, information based on the image file to the terminal apparatus over a communications network,
   the information providing apparatus comprising:
   a restoration processor which restores an original image from an altered image in the image file based on restoration-oriented information in the image file,
   wherein, in response to the transmission request, based on the authorization management information in the image file and based on the relationship, whether or not to permit transmission of the original image restored by the restoration processor to the terminal apparatus is determined and, according to a result of the determination, contents transmitted to the terminal apparatus are controlled.

5. A terminal apparatus comprising:
   a display portion,
   the terminal apparatus receiving, from the information providing apparatus according to claim 4 over a communications network, information based on the image file and displaying an image based on the received information on the display portion.

6. The information providing apparatus according to claim 4, wherein
   the information providing apparatus previously knows the relationship,
   according to the authorization management information and the relationship, the terminal apparatus is given one of a plurality of levels of authorization including first and second authorizations,
   when the terminal apparatus is given the first authorization, in response to the transmission request, the original image restored by the restoration processor is transmitted to the terminal apparatus, and when the terminal apparatus is given the second authorization, in response to the transmission request, transmission of the original image restored by the restoration processor to the terminal apparatus is prohibited.

7. A terminal apparatus comprising:
a display portion,
the terminal apparatus receiving, from the information providing apparatus according to claim 6 over a communications network, information based on the image file and displaying an image based on the received information on the display portion.

8. An image display apparatus comprising:
a file input portion which receives the image file according to claim 2; and
a display portion,
wherein
the authorization management information in the image file includes an authentication code, and
the image display apparatus further comprises:
a restoration processor which restores the original image from the altered image in the image file based on the restoration-oriented information in the image file;
a checker which checks the authentication code and a code registered in the image display apparatus against each other; and
a determiner which determines based on a result of the checking by the checker whether or not to permit display of the original image restored by the restoration processor on the display portion, and
the restoration processor and the display portion are controlled according to a result of the determination by the determiner.

9. The image-sensing apparatus according to claim 1, further comprising:
a specific operation accepter which accepts an operation for specifying the specific region from outside,
wherein when the specific operation accepter accepts the operation, the alteration processor sets the specific region according to the operation.

10. The image-sensing apparatus according to claim 1, wherein
the region having the specific image characteristic detected by the specific region detector is a face region including a person's face,
the specific region detector checks whether or not a face region it has detected fulfills a specific condition, and
the alteration processor sets the specific region based on a face region that has been judged to fulfill the specific condition.

11. The image-sensing apparatus according to claim 10, wherein
a face region is judged to fulfill the specific condition if the face region is classified as one or more of
a face region of a person previously registered on the image-sensing apparatus,
a face region of a person of a specific sex,
a face region of a person of a specific race, and
a face region of a person of a specific age group.

12. The image-sensing apparatus according to claim 1, wherein
the image-sensing portion acquires an original moving image composed of a chronological sequence of a plurality of original images,
the image-sensing apparatus further comprises a tracking processor which tracks a specific subject within the original moving image based on image data of the original moving image, and
the alteration processor
takes one of the plurality of original images as a reference original image, and sets in the reference original image a specific region including the specific subject,
then, based on a result of the tracking by the tracking processor, sets in original images other than the reference original image specific regions respectively such that these specific regions in the original images other than the reference original image include the specific subject, and
then applies the alteration to images inside the specific regions set in the original images respectively to generate from the original moving image an altered moving image composed of a chronological sequence of a plurality of altered images.

13. The image-sensing apparatus according to claim 12, wherein the specific region in the reference original image is set based on image data of the reference original image or based on an operation from outside.

14. The image-sensing apparatus according to claim 1, wherein the restoration-oriented information includes information indicating a position and size of the specific region in the altered image.

15. The image-sensing apparatus according to claim 1, wherein the alteration includes pixelization or masking for altering the image inside the specific region.

16. An information providing apparatus receiving the image file according to claim 1 from a source apparatus and transmitting, in response to a transmission request from a terminal apparatus having a predetermined relationship with the source apparatus and having a display portion, information based on the image file to the terminal apparatus over a communications network,
the information providing apparatus comprising:
a restoration processor which restores an original image from an altered image in the image file based on restoration-oriented information in the image file,
wherein, in response to the transmission request, based on the authorization management information in the image file and based on the relationship, whether or not to permit transmission to the terminal apparatus of the original image restored by the restoration processor is determined and, according to a result of the determination, contents transmitted to the terminal apparatus are controlled.

17. The information providing apparatus according to claim 16, wherein
the information providing apparatus previously knows the relationship,
according to the authorization management information and the relationship, the terminal apparatus is given one of a plurality of levels of authorization including first and second authorizations,
when the terminal apparatus is given the first authorization, in response to the transmission request, the original image restored by the restoration processor is transmitted to the terminal apparatus, and when the terminal apparatus is given the second authorization, in response to the transmission request, transmission of the original image restored by the restoration processor to the terminal apparatus is prohibited.

18. A terminal apparatus comprising:
a display portion,
the terminal apparatus receiving, from the information providing apparatus according to claim 17 over a communications network, information based on the image file and displaying an image based on the received information on the display portion.

19. A terminal apparatus comprising:
a display portion,
the terminal apparatus receiving, from the information providing apparatus according to claim 16 over a communications network, information based on the image file and displaying an image based on the received information on the display portion.

20. An image display apparatus comprising:
a file input portion which receives the image file according to claim 1; and
a display portion,
wherein
the authorization management information in the image file includes an authentication code, and
the image display apparatus further comprises:
a restoration processor which restores the original image from the altered image in the image file based on the restoration-oriented information in the image file;
a checker which checks the authentication code and a code registered in the image display apparatus against each other; and
a determiner which determines based on a result of the checking by the checker whether or not to permit display of the original image restored by the restoration processor on the display portion, and
the restoration processor and the display portion are controlled according to a result of the determination by the determiner.

21. An image-sensing apparatus comprising:
an image-sensing portion which acquires an original moving image composed of a chronological sequence of a plurality of original images;
an alteration processor which applies reversible alteration to an image inside a specific region in the original image to produce from the original image an altered image;
a recording controller which records in a recording portion an image file in which the altered image is stored in association with restoration-oriented information identifying contents of restoration that needs to be performed to restore the original image from the altered image; and
a tracking processor which tracks a specific subject within the original moving image based on image data of the original moving image, and
the alteration processor:
takes one of the plurality of original images as a reference original image, and sets in the reference original image a specific region including the specific subject, then, based on a result of the tracking by the tracking processor, sets in original images other than the reference original image specific regions respectively such that these specific regions in the original images other than the reference original image include the specific subject, and
then applies the alteration to images inside the specific regions set in the original images respectively to generate from the original moving image an altered moving image composed of a chronological sequence of a plurality of altered images.

22. An image file recording method comprising:
acquiring an original image from an image-sensing device;
detecting, via at least one processor of the image-sensing device, a region of the original image having a specific image characteristic based on image data of the original image to set as a specific region for alteration;
applying reversible alteration, via the at least one processor, to the specific region in the original image to produce an altered image;
associating with the altered image, via the at least one processor, restoration-oriented information identifying contents of restoration that need to be performed to restore the original image from the altered image; and
recording the altered image and restoration-oriented information to a computer-readable storage medium of the image-sensing device.

23. The image file recording method as recited in claim 22, wherein recording the altered image and restoration-oriented information is in an image file within the computer-readable storage medium of the image-sensing device.

24. The image file recording method as recited in claim 23, wherein
when the restoration-oriented information is associated with the altered image, authorization management information is also associated with the altered image via the at least one processor,
the altered image, the restoration-oriented information and the authorization management information are recorded in the image file, and
the authorization management information is information for switching between whether to permit or prohibit restoration, for bringing into a viewable state, of the original image from the altered image according to the restoration-oriented information.

25. A non-transitory computer-readable storage medium storing instructions for controlling a device to perform a method comprising:
acquiring an original image from an image-sensing device;
detecting, via at least one processor of the image-sensing device, a region of the original image having a specific image characteristic based on image data of the original image to set as a specific region for alteration;
applying reversible alteration, via the at least one processor, to the specific region in the original image to produce an altered image;
associating with the altered image, via the at least one processor, restoration-oriented information identifying contents of restoration that need to be performed to restore the original image from the altered image; and
recording the altered image and restoration-oriented information to computer-readable storage medium of the image-sensing device.

* * * * *